US012541778B2

(12) United States Patent
Onkels et al.

(10) Patent No.: US 12,541,778 B2
(45) Date of Patent: Feb. 3, 2026

(54) CUSTOMIZED RETAIL ENVIRONMENTS

(71) Applicant: Amazon Technologies, Inc., Seattle, WA (US)

(72) Inventors: David Christopher Onkels, Seattle, WA (US); Ariel Dos Santos, Seattle, WA (US); Thomas Meilandt Mathiesen, Seattle, WA (US); Nir Charny, Redmond, WA (US); Waqas Syed Ahmed, Clyde Hill, WA (US); Hoi Cheung Pang, Bellevue, WA (US); Nishitkumar Ashokkumar Desai, Redmond, WA (US); Danny Guan, Seattle, WA (US); Ameet N. Vaswani, Bellevue, WA (US); Shane Michael Wilson, Mercer Island, WA (US); Michael Vinod Zampani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 16/712,775

(22) Filed: Dec. 12, 2019

(65) Prior Publication Data
US 2021/0182921 A1 Jun. 17, 2021

(51) Int. Cl.
G06Q 30/04 (2012.01)
G06Q 30/0601 (2023.01)
(Continued)

(52) U.S. Cl.
CPC ......... G06Q 30/04 (2013.01); G06Q 30/0621 (2013.01); G06Q 30/0633 (2013.01);
(Continued)

(58) Field of Classification Search
CPC .............. G06K 9/00664; G06Q 30/04; G06Q 30/06–0645; G06Q 30/08; G06Q 50/01;
(Continued)

(56) References Cited

U.S. PATENT DOCUMENTS 9,117,106 B2  8/2015  Dedeoglu et al.
9,235,928 B2  1/2016  Medioni et al.
(Continued)

FOREIGN PATENT DOCUMENTS

CA  3232695 A1 * 10/2017 ............... B67D 7/04
EP  2993637 A1    3/2016
(Continued)

OTHER PUBLICATIONS

K. Wankhede, B. Wukkadada and V. Nadar, "Just Walk-Out Technology and its Challenges: A Case of Amazon Go," 2018 International Conference on Inventive Research in Computing Applications (ICIRCA), Coimbatore, India, 2018, pp. 254-257, doi: 10.1109/ICIRCA.2018.8597403. (Year: 2018).*
(Continued)

Primary Examiner — Adam L Levine
(74) Attorney, Agent, or Firm — Athorus, PLLC

(57) ABSTRACT

This disclosure describes, in part, systems for enabling physical retail stores and other facilities to implement automated-checkout techniques for the purchase of customizable and/or made-to-items items by customers of the stores and/or facilities. For example, the described systems may enable a retail store to implement technology where users are able to order customizable items from an ordering location, an inventory location, or an associate of the facility, and exit the store without performing manual checkout of the items. The systems described herein thus enable customized retail facilities, as opposed to a retail facility that
(Continued)

allows automated-checkout only for prepackaged-type or otherwise non-customizable merchandise.

20 Claims, 12 Drawing Sheets

(51) Int. Cl.
 *H04L 67/12* (2022.01)
 *H04L 67/306* (2022.01)
(52) U.S. Cl.
 CPC ......... *G06Q 30/0639* (2013.01); *H04L 67/12* (2013.01); *H04L 67/306* (2013.01)
(58) Field of Classification Search
 CPC .. G16Y 10/00–90; H04L 67/12; H04L 67/306
 See application file for complete search history.

(56) References Cited

U.S. PATENT DOCUMENTS

| | | | |
|---|---|---|---|
| 9,473,747 B2 * | 10/2016 | Kobres | G06Q 30/00 |
| 10,127,438 B1 | 11/2018 | Fisher et al. | |
| 10,133,933 B1 | 11/2018 | Fisher et al. | |
| 10,140,820 B1 * | 11/2018 | Zalewski | G06Q 20/12 |
| 11,861,678 B1 * | 1/2024 | Grigsby | H04W 4/029 |
| 11,869,065 B1 * | 1/2024 | Eledath | G06V 10/40 |
| 2013/0284806 A1 * | 10/2013 | Margalit | G07G 1/0009 |
| | | | 235/382 |
| 2014/0316916 A1 * | 10/2014 | Hay | G06Q 20/20 |
| | | | 705/17 |
| 2018/0322514 A1 | 11/2018 | Sargent et al. | |

FOREIGN PATENT DOCUMENTS

| | | | | |
|---|---|---|---|---|
| WO | WO-2016004235 A2 * | 1/2016 | | A47F 9/048 |
| WO | WO-2017210451 A1 * | 12/2017 | | G06F 16/435 |

OTHER PUBLICATIONS

PCT Search Report and Written Opinion mailed Mar. 30, 2021 for PCT application No. PCT/US20/64531, 13 pages.

International Preliminary Report on Patentability for PCT App. No. PCT/US20/6453, mailed Jun. 23, 2022.

Japanese Office Action mailed Aug. 30, 2023 for Japanese Patent Application No. 2022-535493, a foreign counterpart to U.S. Appl. No. 16/712,775, 7 pages.

* cited by examiner

CUSTOMIZED RETAIL ENVIRONMENTS

BACKGROUND

Traditional physical stores maintain an inventory of items in customer-accessible areas such that customers can pick items from the inventory and take them to a cashier for purchase, rental, and so forth. In other instances, meanwhile, retail environments may include customizable and/or made-to-order items, such as food and drink items. Further, sensors may be used to generate information about events occurring in these facilities. While the information may be helpful to operators of the retail environments for non-customizable items selected by customers from inventory, use of the sensor-generated information may be limited and/or difficult in the case of customizable items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
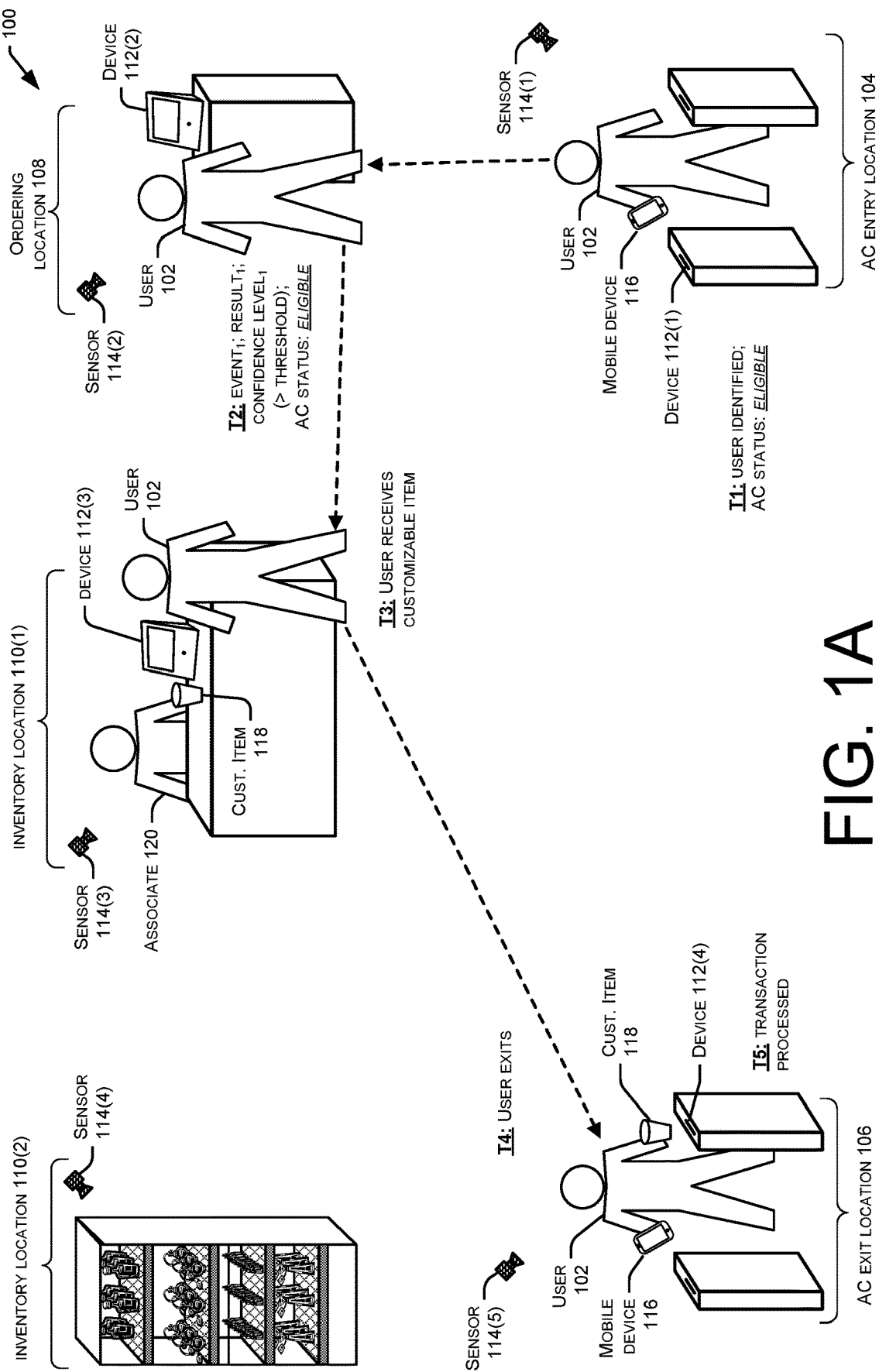
FIG. 1A illustrates an example facility associated with a system for enabling automated checkout (AC) techniques to allow users to enter the facility, order one or more customizable items, and exit the facility without performing a manual checkout of the customizable items. To do so, the system coupled to the environment may identify an entering user and charge an account associated with the user for a cost of the ordered, customizable items upon exit of the user.

This disclosure describes, in part, systems for enabling physical retail stores and other facilities with customizable items to implement automated-checkout (AC) techniques for customers of the stores and/or facilities. For example, the described systems may enable a retail store to implement technology where users are able to order a customizable item and exit the store without performing manual checkout of the item, in addition to allowing users to pick non-customizable items from shelves and other inventory locations. The systems described herein thus enable customized retail facilities with AC, as opposed to an AC retail facility that is limited to pre-packaged, fixed price, or otherwise non-customizable items for purchase.

In some instances, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user picking an item from the inventory location, returning the item to the inventory location, and/or the like. These sensors may include overhead cameras, in-shelf cameras, weight sensors, and/or any other type of sensor configured to generate sensor data indicative of user interactions with the items.

In addition, the facility may include user input devices configured to allow a user and/or an associate of the facility to place and/or confirm an order for a customizable item. In some instances, the user input devices may be used to enter or select options for the customizable item, which may vary in price based on certain criteria, such as weight, volume, toppings, and the like. The customizable item may also be made-to-order, such as a food item that is not assembled or otherwise prepared until it is ordered. In some instances, the user input devices may be provided at an ordering location (e.g., a kiosk). Inventory locations may include a reception area (e.g., a food service counter) wherein a user may receive an ordered customizable item. For instance, within a grocery store, inventory locations may include shelves holding prepackaged food/beverage items, a butcher block for customizable meat selections, a deli section offering made-to-order sandwiches, a coffee counter, or the like.

In addition to including different inventory locations and potentially ordering locations, the facility may include, in some instances, one or more entry locations for entering the facility and one or more exit locations for exiting the facility. For example, the facility may include an AC entry location at which an entering user provides information for identifying an account of the user. For example, the AC entry location may include a scanner or other imaging device at which an entering user scans or otherwise provides a unique code associated with the account of the user, such as a code displayed on a mobile device of the user. Or, the entry location may include a microphone, camera, or other sensor that generates sensor information at the request of the user for use in identifying the account of the user. In still other instances, the AC entry location may include an input device for reading information from a payment card of a user, such as a credit card, debit card, prepaid card, etc. For example, the AC entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an AC exit location where an exiting user provides information for identifying an account of the exiting user. The AC exit location may include, similar to the AC entry location, a scanner or other imaging device at which the exiting user scans or otherwise provides a unique code associated with the account of the user, such as the code displayed on the mobile device of the user. Or, the AC exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location within the facility. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

Within this example facility, if a user enters through an AC entry location and provides information identifying an account of the user, or the user enters the facility and provides information identifying the account of the user at an ordering location, then a system associated with the facility may generate a record indicating the presence of the user at the facility. The record may store an indication of the identity of the user, as well as an indication of whether the user is currently eligible to exit the facility (with items procured by the user) via the AC exit location.

In addition, sensor data generated from sensors at the facility may be used to determine current positioning of the user, which may also be stored in association with the record of the user. For example, overhead cameras, floor weight sensors, and/or the like may be used to maintain, in the record and at the knowledge and request/consent of the user, the current location of the user within the facility. Further, this sensor data (e.g., image data) may be used to locate the user as the user navigates through the store. Further, if the user interacts within one or more items housed at an inventory location, and/or orders a customizable item, the system may generate data indicative of the event. This data may comprise result data, indicating a result of the order of the customizable item or the interaction between the user and the customizable or non-customizable item. In some instances, this result data indicates an action taken (e.g., an order, a confirmation of an order, a pick of an item, a return of an item, etc.), a description or identity of the item acted upon (e.g., a latte, a bottle of ketchup, a pair of jeans, etc.), a quantity and/or size of the item involved, a location of the item (e.g., meat counter, aisle, shelf, lane, etc.), a cost of the item, and/or the like.

Continuing the example, envision that an identified user enters the facility and goes to an ordering location within the facility. For instance, the user may approach a user input device at an ordering location within the facility, such as an order kiosk. The user may place an order for a customizable item at the order kiosk. For instance, the user may order a cheeseburger with extra cheese from the order kiosk. The record of the user may now indicate an identity of the user, an account of the user, and a position of the user at or near the order kiosk. The system may also generate result data reflecting the order and associate the result data with the account of the user (e.g., a virtual cart of the user). In other words, the cheeseburger with extra cheese and its corresponding cost (including an "upcharge" cost for the extra cheese) may be added to the virtual cart of the user.

Further, envision that an identified user also goes to one or more inventory locations within the facility and picks up one or more non-customizable items. In some instances, the system may make this determination based on image data captured from overhead cameras or other sensors. For instance, the system may determine that the user has picked up a bag of chips from a rack inside the facility and a can of diet cola from a refrigerated display case. The bag of chips and can of diet cola may then also be added to the virtual cart of the user.

In some instances, the system may generate the result data reflecting the order along with a confidence level indicating a confidence associated with the result data. If the confidence level associated with the result data is greater than a threshold confidence level, then the result data may be associated with the virtual cart of the user. For example, if the system determines, with a confidence level that is greater than the threshold, that the user was the one standing at the order kiosk when the order for the cheeseburger with extra cheese was entered, then the cheeseburger with extra cheese may be added to the virtual cart of the user. Similarly, confidence levels may be generated for the picking of the bag of chips and can of diet cola. Further, the record associated with the user may indicate that the user is eligible to exit through the AC exit location, given that the user is identified and the event that the user performed was determined to be associated with high-confidence result data.

Upon finishing his or her shopping, the user may approach the AC exit location and, in some instances, scan or otherwise provide identifying information to enable the system to identify the exiting user. After scanning his or her unique code at the AC exit location, for instance, the user may exit the facility. The system, meanwhile, may thereafter charge an account of the identified exiting user for a cost of the items procured by the user within the facility. Of course, while the above example describes the user scanning a unique code (e.g., via a mobile device of the user), it is to be appreciated that the exiting user may be identified based on other sensor data, such as image data, voice data, or the like.

If, however, the confidence level associated with the result data is less than the threshold, then the system may perform one or more additional techniques for determining the result of the event. For example, the system may send user input device and/or sensor data (e.g., image data, weight-sensor data, etc.) to one or more human users for analysis. Further, given that the event is not associated with high-confidence result data, the record associated with the user may be updated to indicate that the user is not eligible to exit through the AC exit location. If, however, the result data is updated to indicate a high-confidence result (e.g., based on the human analysis, etc.), then the record may again be updated to indicate that the user is eligible to exit through the AC exit location, given that the user is identified and associated with high-confidence result data.

To summarize, high-touch use cases in retail facilities, such as made-to-order food and beverages, present unique challenges for the implementation of AC techniques. Traditionally, a customer has had to interface with a human (store associate) to complete a transaction. This disclosure presents a system capable of inserting high-confidence product 'take' events (i.e., purchases) into a virtual shopping cart of a user for processing. As such, AC techniques support simple or complex customizable product configurations (e.g., coffee customizations like extra shots, flavors, etc.). AC techniques may therefore be expanded to a broad variety of retail scenarios, including cafeterias, food halls, coffee bars, the purchase of age-restricted items (e.g., alcoholic beverages), print-on-demand type products (e.g., t-shirt with my name on it), and enjoying rides and/or food at an amusement park, zoo, or arcade, for example.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1G collectively illustrate an example facility 100 associated with a system for enabling automated checkout (AC) techniques to allow users, such as example user 102, to enter the facility 100, order and/or pick one or more items, and exit the facility without performing a manual checkout of the items. To do so, the system coupled to the environment may identify a user and charge an account associated with the user for a cost of the ordered and/or picked items upon exit of the user.

As illustrated in FIGS. 1A-1G, the example facility 100 includes an AC entry location 104 and an AC exit location 106. The example facility 100 also includes an ordering location 108 and inventory locations 110. In some examples, facility 100 may also include devices 112, which may include various types of scanning devices and/or user input devices to help facilitate AC techniques, which will be described in more detail below. Facility 100 may also include sensors 114. As suggested above, sensors may include cameras, microphones, floor weight sensors, and/or the like to help facilitate AC techniques. In general, the devices 112 and/or the sensors 114 may be associated with AC entry locations 104, AC exit locations 106, ordering locations 108, and/or inventory locations 110. Various example AC scenarios will now be described with reference to the example facility 100 shown in FIGS. 1A-1G.

Referring to FIG. 1A, the AC entry location 104 (e.g., entry gate) may request that entering users provide identifying information prior to entering the facility 100. In the illustrated example, the user 102 enters through the AC entry location 104 by scanning a unique code presented on a mobile device 116 of the user 102, such as at a scanning device 112(1) at the AC entry location 104. The scanning device 112(1) may provide this information to a system, such as an inventory management system discussed in following figures, which may use this information for identifying the entering user 102. Of course, while this example describes identifying the user 102 based on the user 102 scanning an unique code presented on the mobile device 116, the system may additionally, or alternatively, identify the user 102 based on voice data (e.g., the user stating his or her name), image data (e.g., image data of a face of the user), password data (e.g., an alphanumeric string), credit card data, and/or any other type of data. For instance, the system may identify the user 102 based on data provided by sensor 114(1), or based on credit card data provided by device 112(1). In some examples, those users that have consented/requested to take part in the AC techniques may be identified, while the system may refrain from identifying other users entering the facility 100. As suggested above, in some examples a facility may not have specified entry locations or gates. (A scenario without a specified entry location is described relative to FIG. 1G, below.)

In the scenario illustrated in FIG. 1A, upon the user 102 entering the facility 100 via the AC entry location 104 at a first time ($T_1$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at $T_1$ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at $T_1$ to exit the facility 100 with item(s) without performing manual checkout of the items.

In some instances, the system may, additionally or alternatively to the user 102 being identified, store an indication that the user 102 is eligible to exit the facility without performing manual checkout of the items based on the user being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user in the facility 100 with the identified payment instrument. In yet another example, the AC exit location 106 may include a device 112 configured to accept cash, such that a user 102 may input a certain amount of cash and remain eligible for exiting the facility 100 without performing a manual checkout exit, so long as the user 102 does not obtain items having a cumulative value (e.g., with taxes, etc.) that exceeds the amount of inserted cash.

Returning to the scenario in FIG. 1A, in this example the user 102 enters the facility 100 and proceeds to an ordering location 108. As described above, at the ordering location 108, result data associated with events may be determined automatically via user input device 112 and/or sensor 114 data. For example, the ordering location 108 may be within the field-of-view of sensor 114(2), which may represent one or more overhead cameras, in-shelf cameras, or the like. Image data from sensor 114(2) may be used to determine the results of events that occur at the ordering location 108. In addition, or in the alternative, the ordering location 108 may include one or more other sensors, such as a microphone or the like, which may generate sensor data for identifying the results of the events.

In the illustrated example, at a second time ($T_2$) the user 102 orders a customizable item 118 from the ordering location 108. The user may order the customizable item 118 via device 112(2) at ordering location 108. A wide variety of device types and methods of interfacing with device 112(2) are contemplated for ordering the customizable item 118. For instance, the user may select the customizable item 118, including customized options, from a touch-screen display of device 112(2). In other cases, device 112(2) may present a simple button for the user 102 to depress to indicate his or her order, or may be voice-activated for ordering purposes. For purposes of this scenario, envision that the user 102 interacts with a touch-screen display of device 112(2) to order a latte, and further specifies a 16-ounce size and an extra shot for the latte.

The system may use data generated by sensor 114(2) and/or device 112(2) to determine an event associated with the user 102. In this example, the event is the order by the user 102 of the customizable item 118. As illustrated, at $T_2$ the system detects this event ($Event_1$), a result of this event ($Result_1$), and a confidence level associated with the result ($Confidence\ Level_1$). The result may comprise an indication of the action (e.g., order), the identity of the item(s) involved (e.g., the 16-ounce latte with an extra shot, a breakfast sandwich with ham instead of sausage, etc.), a quantity and/or size of the item(s), an identity of the user 102, and/or additional data. The confidence level, meanwhile, may indicate a degree to which the system is confident regarding the calculated result. In some instances, the result and the confidence level may be determined using one or more classifiers previously trained using training sensor data and manually labeled results, as described further below. Furthermore, the confidence level may be compared to a threshold and, if the confidence level is greater than a threshold, then the system may update a virtual cart of the identified user 102 based to reflect the calculated result. Stated another way, the system may add the 16-ounce latte with an extra shot to the virtual cart of the user 102 upon ensuring with a high-enough confidence level that it was user 102 that ordered that particular customized item 118. If, however, the confidence level is less than the threshold, then the system may perform one or more further actions for determining and/or verifying the result and/or may refrain from updating the virtual cart of the user 102.

In the illustrated example, at $T_2$ the system determines a result, and that a confidence level associated with the result is greater than a pre-determined threshold. Thus, the customizable item 118 that was determined to be ordered by the user 102, in this example, is added to the virtual cart of the user. In addition, because this result was a high-confidence result, the system maintains, in the record associated with the user 102, an indication that the user 102 is still eligible to exit the facility 100 without performing manual checkout of items. Stated otherwise, because the system is confident that the current virtual cart of the user 102 is accurate, the system refrains from updating the record to indicate that the user 102 is ineligible from exiting the facility 100 without performing a manual checkout.

Next, at a third time ($T_3$) the user 102 moves to an inventory location 110(1) to receive the customizable item 118. In some examples, receiving the customizable item 118 may not be sensed and/or tracked. For purposes of AC, the order of the customizable item 118 being added to the record associated with user 102 may be sufficient to allow the user 102 to exit the store. In other examples, various further actions by either the user 102 or a store associate 120 are contemplated. For instance, the user 102 or the store associate 120 may confirm the order, either at device 112(2) or device 112(3). The system may confirm the order based on sensor data from sensor 114(3), indicating the user 102 receiving the customizable item 118, or confirming receipt of the customizable item 118 via device 112(3). In some cases, where the confidence level of the order event for customizable item 118 was not above a threshold, sensor 114 or device 112 data may be used by the system to increase the confidence level to meet the threshold value, thereby enabling AC. Further, in some cases, the receiving of the customizable item 118 by user 102 may be added by the system as an event (e.g., $Event_2$).

At a fourth time ($T_4$), in this example the user 102 exits the facility 100 at the AC exit location 106 by, for example, providing identifying information, or by simply exiting the facility 100 without scanning or providing identifying information. For example, similar to the AC entry location 104, the AC exit location 106 (e.g., exit gate) may include a device 112(4) that enables user 102 to scan a unique code from his or her mobile phone 116, or provide any other type of identifying information. In still other instances, user 102 may walk out and the system may identify user 102 via facial-recognition techniques using data from sensor 114(5), for example. In such instances user 102 may have requested and/or given permission for such automatic recognition techniques. As noted above, in some examples a facility may not have specified exit locations or gates. (A scenario without a specified exit location is described relative to FIG. 1G, below.)

In response to the user 102 attempting to exit the facility 100, the system may identify the record associated with the user 102, determine that the user 102 is eligible to "just walk out", and end a shopping session of user 102. At a fifth time ($T_5$), the system may then process a corresponding transaction, such as charging an account (e.g., a payment instrument, an account previously associated at the system, etc.) of the user 102 for the customizable item 118 listed on the virtual cart of the user 102. The transaction processing may also include supplying a notification and/or receipt or other record of the transaction to the user 102, such as on their mobile device 116. Note that the facility also may offer the user 102 a selection of methods to pay upon exit. For instance, the user may be able to select, via device 112(4), mobile device 116, or another device, to pay with cash or another form of payment instead of the payment instrument that was selected by the system. The user 102 may make this selection at any time, including a time prior to exit from the facility. The user 102 may also choose to complete their transaction with an associate 120 at the facility 100, for instance.

Figure 1B:
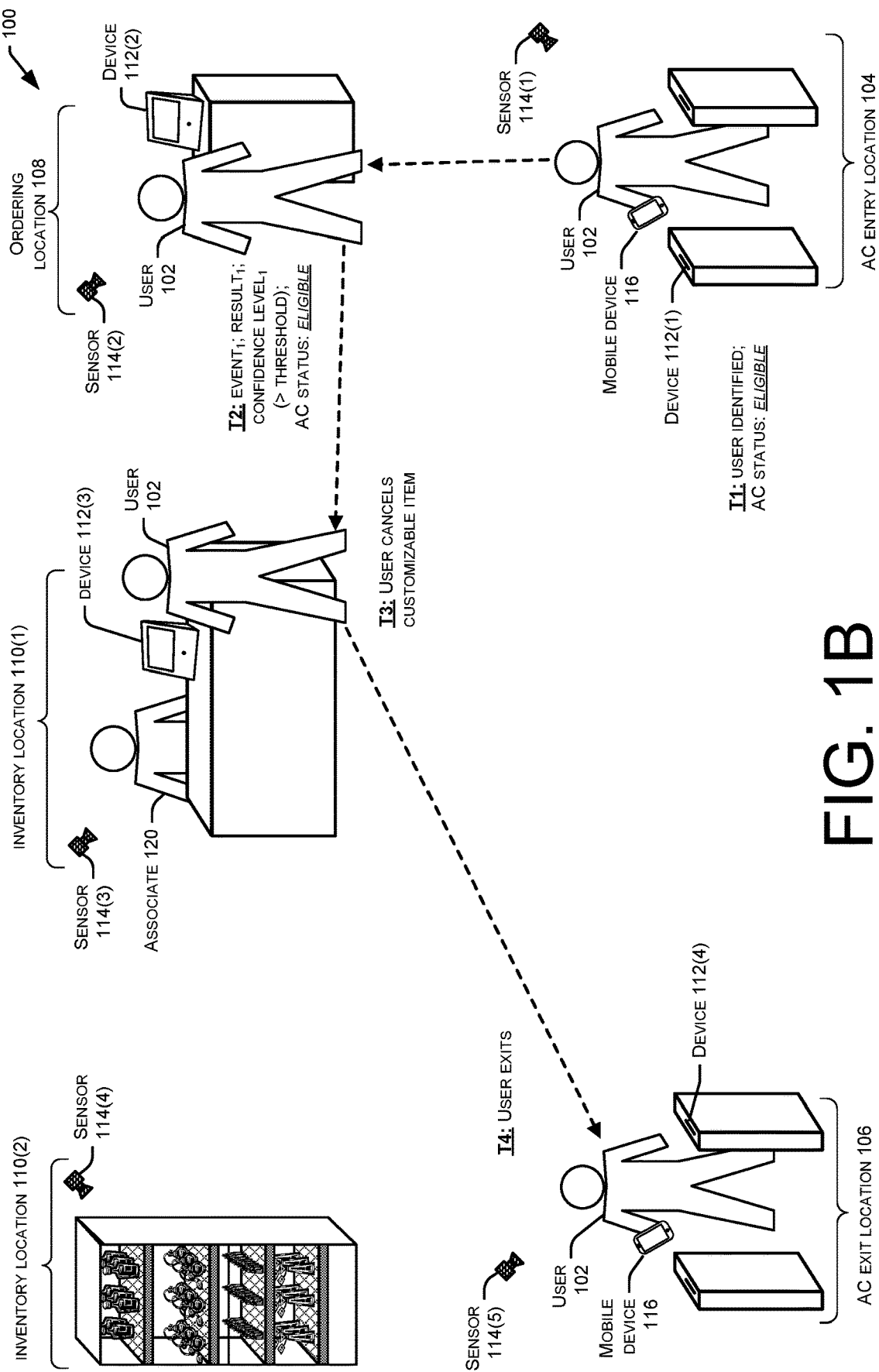
FIG. 1B illustrates the example facility of FIG. 1A. In this example, the user orders a customizable item, but changes their mind before receiving the customizable item. The order may be cancelled without the user being charged for the cost of the item, based at least on input from either the user or an associate of the facility.

FIG. 1B illustrates another example AC scenario within the facility 100 of FIG. 1A. In this example, the user 102 again enters the facility 100 through the AC entry location 104 and scans his or her unique identifier displayed on the mobile device 116. The system thus identifies the user at $T_1$ and generates a record indicating that the user 102 is eligible perform AC. The user 102 again orders a customizable item from the ordering location 108. At $T_2$ the system determines a result, and that a confidence level associated with the result is greater than a pre-determined threshold. Thus, the customizable item is added to the virtual cart of the user 102, and the record associated with the user 102 includes an indication that the user 102 is eligible to exit the facility 100 without performing manual checkout of the customizable item. However, in this example, the user 102 changes his or her mind about the customizable item sometime after ordering, but before receiving the customizable item.

A variety of methods are conceived for updating the record of the user 102 and/or the virtual cart to indicate that the user 102 has cancelled an order for an item. For instance, the user may cancel the item while still at the ordering location 108 via the device 112(2), or the user 102 may return to the ordering location 108 to cancel the item. The user 102 may be able to access a representation of his or her virtual cart via a visual display of the device 112(2). In some cases, the system may determine that user 102 is at the ordering location 108, such as using sensor 114(2), and automatically offer a representation of the virtual cart to the user 102. In other instances, the user 102 or associate 120 may indicate a cancellation of the item via device 112(3). For instance, user 102 may approach associate 120 and ask to have the item cancelled.

In the illustrated example in FIG. 1B, at a third time ($T_3$) user 102 cancels the order for the customizable item by asking associate 120 with assistance in cancelling the order. The associate 120 interacts with device 112(3) to cancel the order, and the record associated with user 102 is updated to indicate that the customizable item has been removed from the virtual cart. At a fourth time ($T_4$), user 102 exits the facility 100 at the AC exit location 106, and an account of the user 102 is not charged, since the user 102 had no items in their virtual cart at the time of their exit. In some cases, no record is retained of this activity. In other cases, a record of the cancelled order may be retained for data analysis purposes. Also, a record of the cancelled order may or may not be provided to the user 102.

Figure 1C:
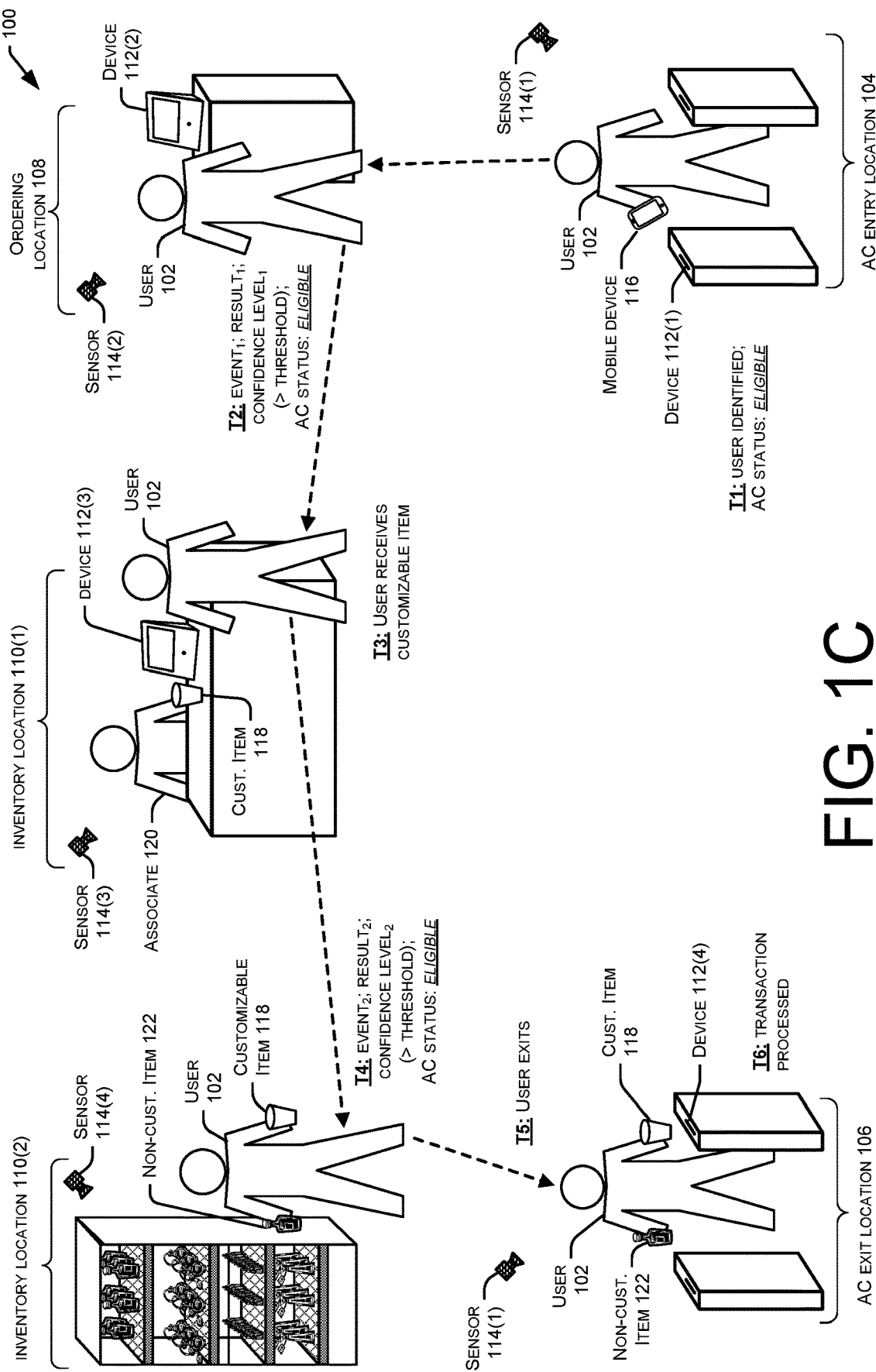
FIG. 1C illustrates the example facility of FIG. 1A. In this example, the user orders a customizable item and also picks one or more non-customizable items. The system coupled to the environment may identify the user and charge the account associated with the user for a cost of the ordered, customizable item and the picked, non-customizable items upon exit of the user.

FIG. 1C illustrates another example AC scenario within the facility 100 of FIG. 1A. In this example, the user 102 again enters the facility 100 through the AC entry location 104 and scans his or her unique identifier displayed on the mobile device 116. The system thus identifies the user at $T_1$ and generates a record indicating that the user 102 is eligible perform AC. The user 102 again orders a customizable item 118 from the ordering location 108. At $T_2$ the system determines a result, and that a confidence level associated with the result is greater than a pre-determined threshold. Thus, the customizable item 118 is added to the virtual cart of the user, and the record associated with the user 102 includes an indication that the user 102 is eligible to exit the facility 100 without performing manual checkout of the customizable item 118. In this example, at $T_3$ user 102 receives the customizable item 118 and continues browsing the facility 100.

In the example shown in FIG. 1C, at a fourth time ($T_4$) the user 102 removes (or "picks") a non-customizable item 122 from inventory location 110(2). The system may use data generated by sensor 114(4) to determine another event associated with the user 102. In this example, the event is the pick by the user 102 of the non-customizable item 122. In response, the system may use sensor data indicative of this event to determine result data associated with this event. As illustrated, at $T_4$ the system detects this event ($Event_2$), a result of this event ($Result_2$), and a confidence level associated with the result (Confidence $Level_2$). The result may comprise an indication of the action (e.g., pick, return, etc.), the identity of the item(s) involved (e.g., can of diet cola, protein bar, etc.), a quantity of the item, an identity of the user, a price of the item, and/or additional data. The confidence level and the threshold associated with the event may be similar to those described above with respect to $Event_1$. In the illustrated example, the confidence level is greater than the threshold, and the system may update the virtual cart of the user 102 to include the non-customizable item 122.

In this case, at a fifth time ($T_5$), user 102 exits the facility 100 at the AC exit location 106. In response to the user 102 attempting to exit the facility 100, the system may identify the record associated with the user 102, determine that the user 102 is eligible to "just walk out", and end a shopping session of user 102. At a sixth time ($T_6$), the system may then process a corresponding transaction, such as charging an account of the user 102 for the customizable item 118 and the non-customizable item 122 listed on the virtual cart of the user 102. The transaction processing may also include supplying a notification and/or receipt or other record of the transaction to the user 102, such as on their mobile device 116.

Figure 1D:
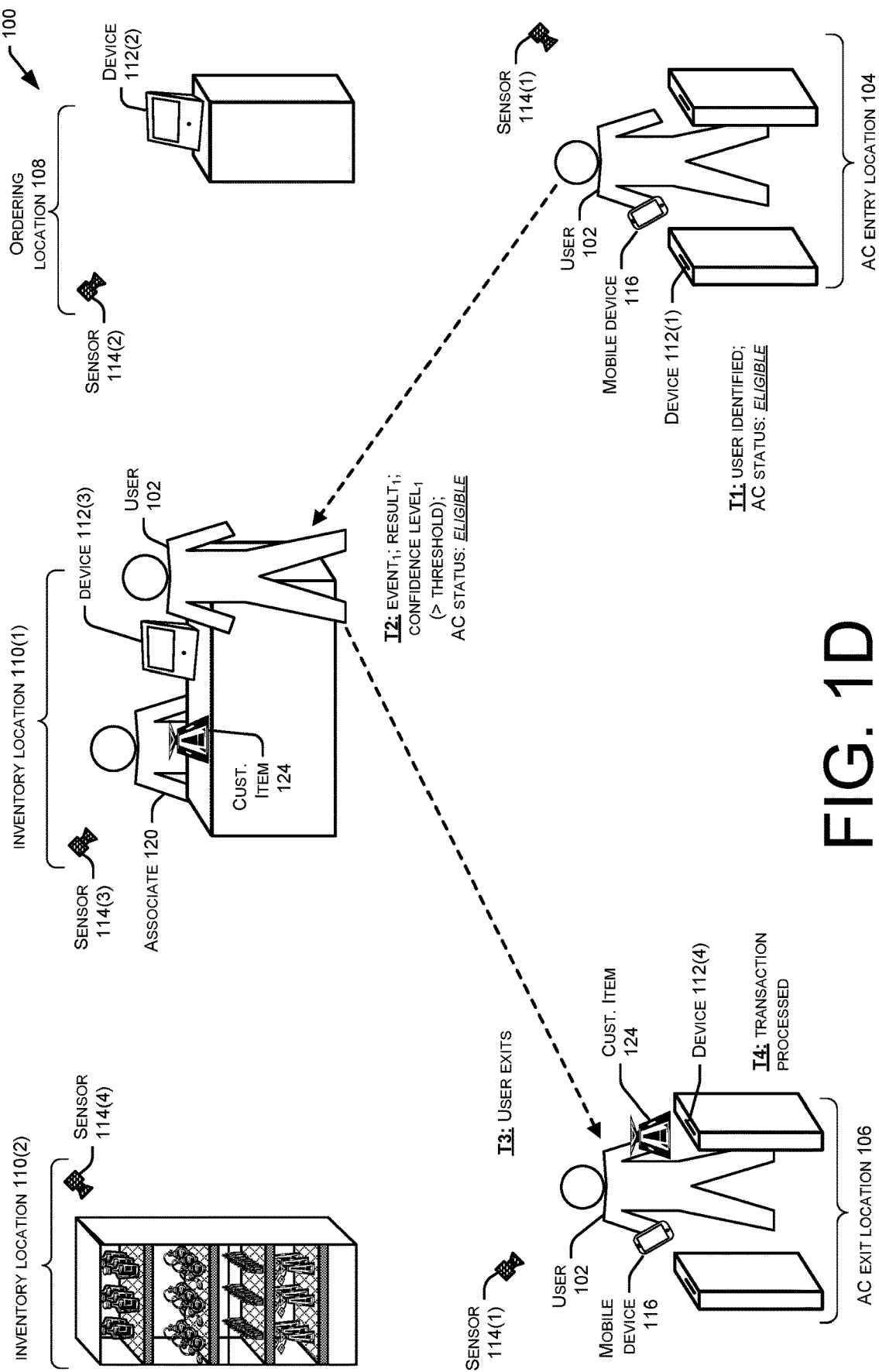
FIG. 1D illustrates the example facility of FIG. 1A. In this example, the user interacts with an associate of the facility to order a customizable item. The system coupled to the environment may determine a cost to charge the account of the user based at least on input from the user and/or the associate of the facility.

FIG. 1D illustrates another example AC scenario within the facility 100 of FIG. 1A. In this example, the user 102 again enters the facility 100 through the AC entry location 104 and scans his or her unique identifier displayed on the mobile device 116. The system thus identifies the user at $T_1$ and generates a record indicating that the user 102 is eligible perform AC. In this example, user 102 proceeds to inventory location 110(1) to order customizable item 124. For purposes of illustration, envision that user 102 orders customizable item 124 from associate 120, specifying a ham sandwich with lettuce, tomato, and mustard, no mayonnaise, and wrapped "to-go." In this example, associate 120 interacts with device 112(3) to enter the order into the system. As illustrated, at $T_2$ the system detects this event ($Event_1$). The system may also use sensor 114(3) to determine that user 102 requested and/or received the customizable item 124, therefore determining a result of this event ($Result_1$), and assigning a confidence level associated with the result ($Confidence\ Level_1$). In this case, once again the confidence level meets a predetermined threshold. Thus, the customizable item 124 is added to the virtual cart of the user 102, and the record associated with the user 102 includes an indication that the user 102 is eligible to exit the facility 100 without performing manual checkout of the customizable item 124. At a third time ($T_3$), user 102 exits the facility 100 at the AC exit location 106. Once again, in response to the user 102 attempting to exit the facility 100, the system may identify the record associated with the user 102, determine that the user 102 is eligible to "just walk out", and end a shopping session of user 102. At a fourth time ($T_4$), the system may then process a corresponding transaction, such as charging an account of the user 102 for the customizable item 124 and supplying a receipt of the transaction to the user 102.

Referring again to FIG. 1D, a variety of techniques are envisioned for the user 102 ordering a customizable item 124 from an associate 120 at an inventory location 110 in a manner that enables AC, both by identifying the user as being associated with the order and by recording customizable options with the order. Envision a butcher counter, in which there may be a consultation process with the associate 120 (e.g., butcher) to help user 102 select the customizable item 124. For instance, the butcher may need to ask the customer about a type of meat, amount (e.g., weight), seasoning, other preparation options (e.g., tied, trimmed), etc. This scenario may include additional sensor input, such as weighing the meat or identifying the user 102 talking to the associate 120. A variety of these options may be recognized by the system and added to a record associated with the user 102. For example, the system may match weight data from a scale with a record of a corresponding customizable item, and add this information to a virtual cart of user 102. In some examples, the system may register a confirmation of the user receiving and/or accepting the customizable item 124 to match the order to the user 102, such as using sensor 114(3), or by receiving confirmation of the order from the user 102 or the associate 120, such as through device 112(3). For instance, the system may cause a representation of the customizable item and/or an associated price to be presented to the user 102 on a visual display of device 112(3) so that the user may provide confirmation. In other cases, the user 102 may simply push a button to confirm the order and/or be identified.

Figure 1E:
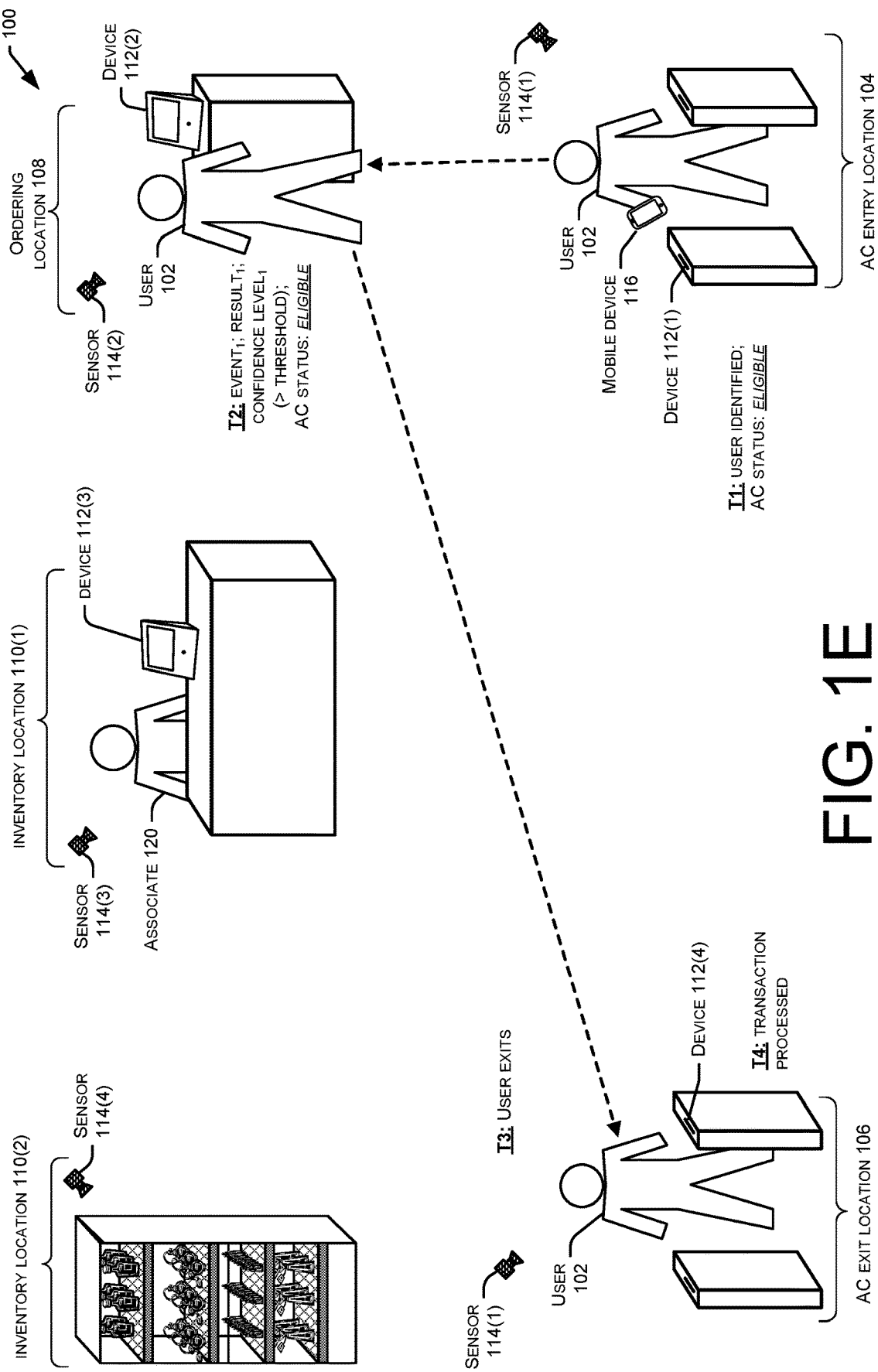
FIG. 1E illustrates the example facility of FIG. 1A. Here, the user orders a customizable item from within the facility. In this example the customizable item is available at a pickup location that is outside of the facility. The system coupled to the environment may charge the account associated with the user for a cost of the ordered, customizable item upon exit of the user, and a record may be provided for the user to pick up the customizable item at the pickup location.

FIG. 1E illustrates another example AC scenario within the facility 100 of FIG. 1A. In this example, the user 102 again enters the facility 100 through the AC entry location 104 and scans his or her unique identifier displayed on the mobile device 116. The system thus identifies the user at $T_1$ and generates a record indicating that the user 102 is eligible perform AC. The user 102 again orders a customizable item from the ordering location 108. However, in this case, the customizable item is relatively large, and there is a pickup location outside of the facility 100. For purposes of illustration, consider that user 102 has ordered an air conditioning unit to take home and be installed in their residence. The facility 102 may have a pickup location (e.g., warehouse, loading dock, etc.) for such items. In some examples, the "customizable item" may include an item that is not able to be "picked" out of an inventory location 110 within a facility 100, rather than an item that requires selecting options or made-to-order items. For instance, some items may be too large, too heavy, or otherwise too unwieldy for a person to reasonably be expected to pick the item off a shelf.

As illustrated in FIG. 1E, at $T_2$ the system determines a result, and that a confidence level associated with the result is greater than a pre-determined threshold. Thus, the customizable item is added to the virtual cart of the user 102, and the record associated with the user 102 includes an indication that the user 102 is eligible to exit the facility 100 without performing manual checkout of the customizable item. At $T_3$ user 102 exits the facility 100. In this example, at $T_4$ the system processes the transaction. In some instance, $T_4$ may be while the user 102 is exiting the facility 100 or soon after, or $T_4$ may not occur until the user is at the pickup location and has received the ordered customizable item. Note that the pickup facility may also have sensors or devices to assist with identifying the user 102, matching the person picking up the item to the user 102 that ordered the item, confirming receipt of the item by the user 102, etc. Such sensors and/or devices at the pickup facility may also be communicatively coupled to the system at the facility 100.

Figure 1F:
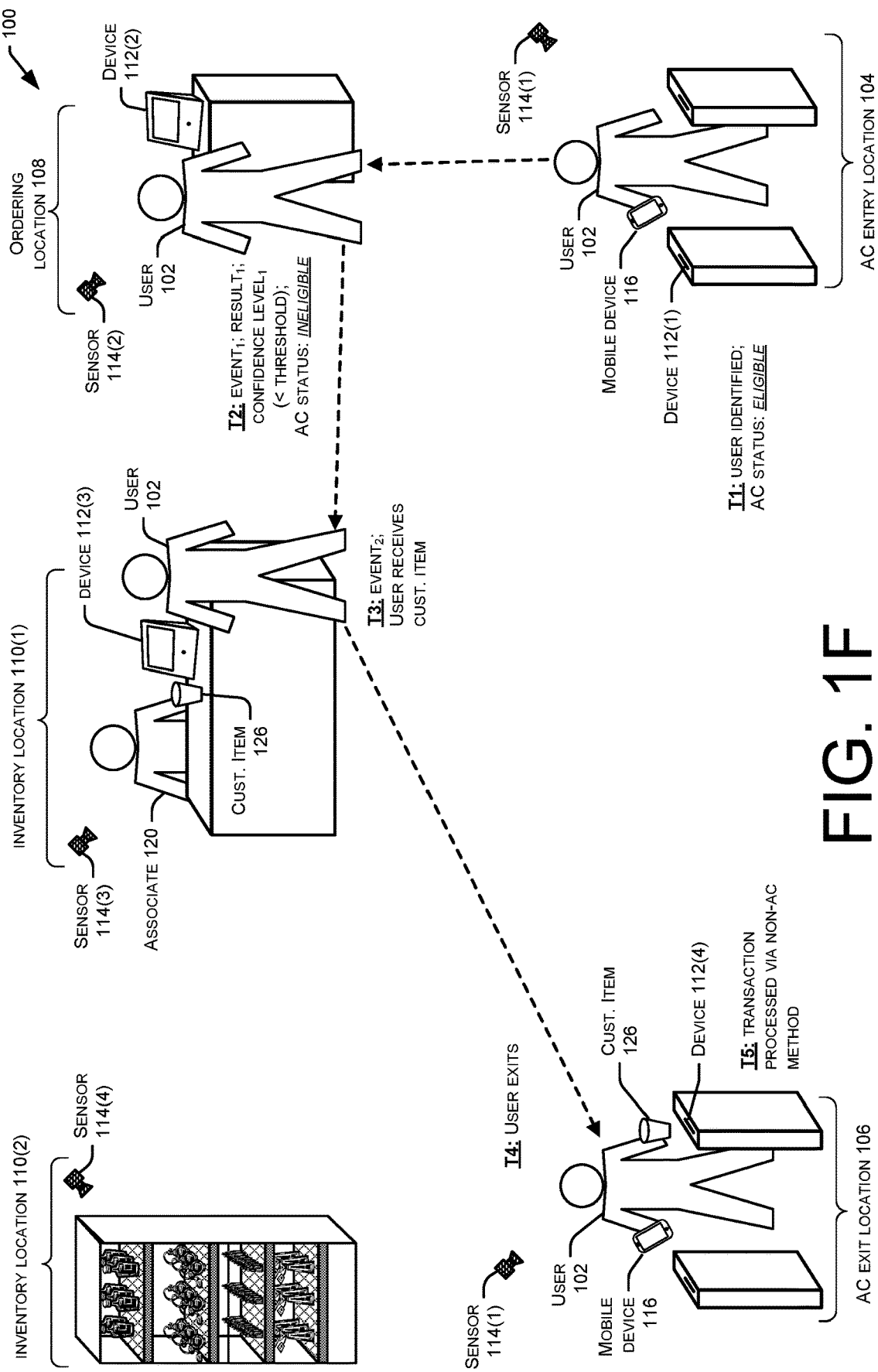
FIG. 1F illustrates the example facility of FIG. 1A. Here, the user is ineligible for AC due to a variety of potential issues. The user orders a customizable item and also picks one or more non-customizable items. As the user exits the facility, the user provides payment for the customizable and non-customizable items via an alternative method than an account of the user being automatically charged.

FIG. 1F illustrates another example AC scenario within the facility 100 of FIG. 1A. In this example, the user 102 again enters the facility 100 through the AC entry location 104 and scans his or her unique identifier displayed on the mobile device 116. The system thus identifies the user at $T_1$ and generates a record indicating that the user 102 is eligible perform AC. The user 102 again orders a customizable item 126 from the ordering location 108. At $T_2$ the system determines a result. However, in this instance a confidence level associated with the result does not meet a pre-determined threshold. For instance, perhaps the area around the ordering location 108 was crowded, and the system was unable to differentiate the user 102 from another person that may have placed the order with a sufficient confidence level. Thus, the customizable item 126 is added to the virtual cart of the user 102, but the record associated with the user 102 includes an indication that the user 102 is not eligible to exit the facility 100 with AC for the customizable item 126. At $T_3$ user 102 receives the customizable item 126 and attempts to exit the facility 100 at $T_4$.

In this example, because the record associated with the user 102 indicates that the user 102 is ineligible to exit through the AC exit location 106 (at least until the user performs a manual checkout of the items), the system may generate and output, to the user 102, notification data indicating that the user is to provide payment by a method other than AC. This notification data may be output via the mobile device 116 of the user 102, via a device 112(4) at the AC exit location 106, or in any other audible, visual, and/or tactile manner. It is to be appreciated that this notification data may be presented at any other time. For example, the notification data may be sent to and presented upon the mobile device 116 of the user 102 upon the system determining the occurrence of the low-confidence event and/or at any other time prior to exit of the user 102 from the facility 100. At $T_5$ the transaction may be processed by the user 102 paying for the customizable item 126 by a variety of alternative methods before exiting the facility 100. For instance, the user 102 may interact with an associate at a point of sale (POS) device at an exit location or another location within the facility 100, the user 102 may perform a self-checkout via a self-checkout process, such as inserting or scanning a credit card or cash at device 112(4), or the checkout may be performed in any other manner.

Note that other scenarios are envisioned in which a user may be ineligible to exit the facility 100 with AC. For example, a user 102 may not provide identifying information upon entering the facility, in turn, the system is unable to identify the user 102. In this case the system may generate a record associated with the unidentified user 102 and may continue to locate the user within the facility 100. However, because the user 102 is not identified, and thus the system is unable to locate an account of the unidentified user 102, the record may indicate that the user 102 is not eligible to exit with items without performing a manual checkout of the items. In another example, a user 102 may pick a non-customizable item from an inventory location, but the system may be unable to determine which item the user 102 selected.

In some examples, an event may be upgraded from relatively low-confidence to relatively high-confidence prior to the user 102 exiting the facility 100, and the system may update the record associated with the user 102 to indicate that the user 102 is now eligible to exit through the AC exit location 106. For instance, a previously unidentified item picked by the user 102 may in fact be identified prior to the user 102 exiting the facility 100. For example, the user 102 may use the mobile device 116 or another device in the facility to scan an identifier of the item and send this information to the system. In another example, the system may have processed additional sensor data to determine a high-confidence result of the event, may have received an indication of the result of the event (e.g., the identity of the item) from one or more human users, or may have determined a high-confidence result of the event in any other manner. In one example, when the system determines that a low-confidence result associated with an event, the system may request that the user 102, an associate, or other user verify the result of the event in order to update the result to high-confidence. For example, the system may cause a display, on a device in the facility, to show a screen requesting that the user 102 or an associate verify the identity of the item determined by the system, a quantity of the item determined by the system, and/or the like. This screen may be presented on the mobile device 116 of the user 102, a device 112 of the facility 100, and/or on any other device. In response to receiving this information from the user 102 or associate, the system may update the result from low- to high-confidence such that the user 102 is now eligible to exit through the AC exit location 106. Similarly, it is to be appreciated that the system may be able to identify a previously unidentified user 102 prior to the user 102 exiting the facility 100 (e.g., using facial-recognition techniques, the user scanning his or her unique code, etc.), and the system may update a record to indicate that the user 102 has become eligible to exit the facility 100 with one or more items via the AC exit location 106.

Figure 1G:
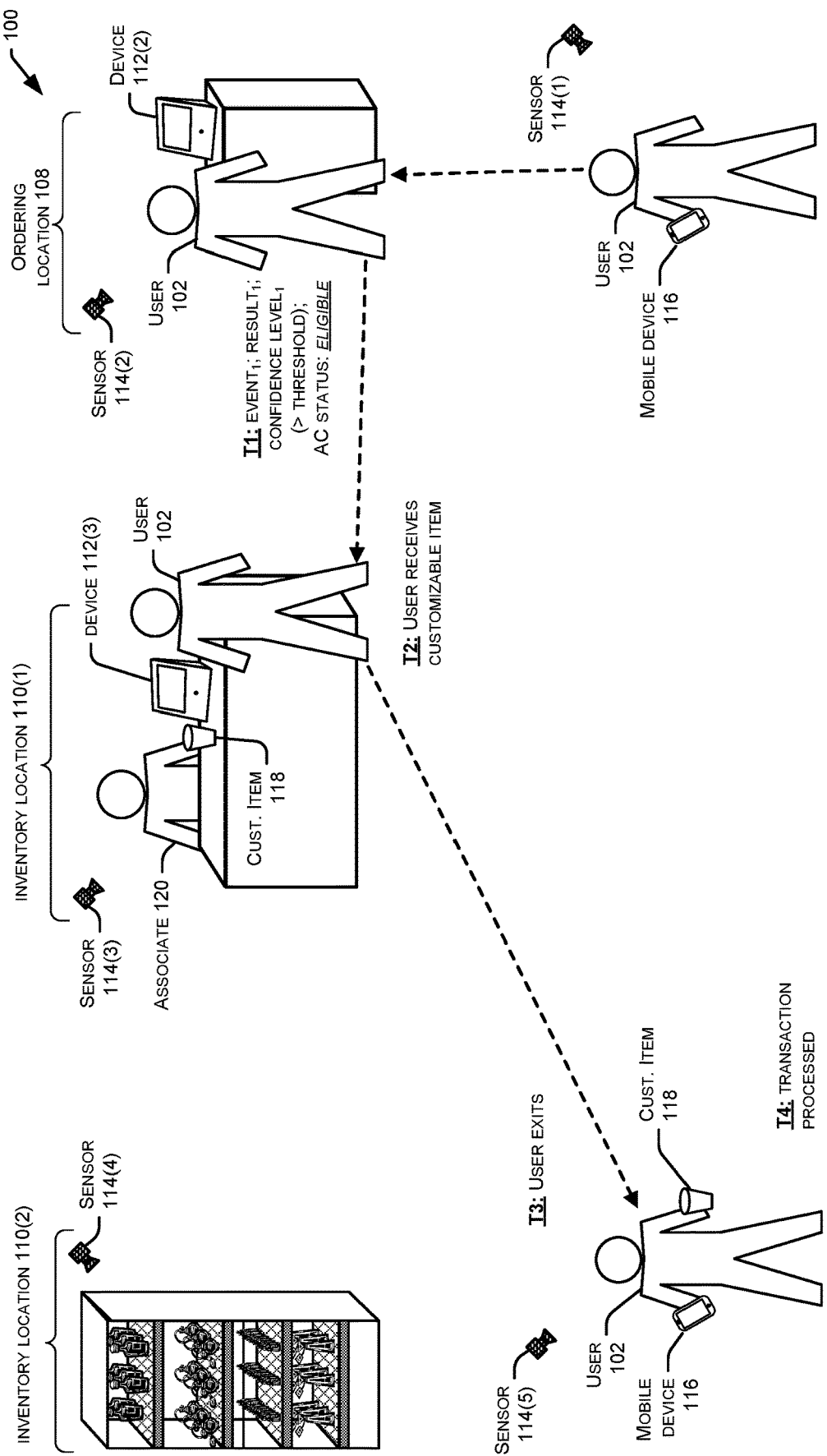
FIG. 1G illustrates the example facility of FIG. 1A. Here, the example facility does not have AC entry and/or exit locations. In this example, the user may access an ordering location and/or an inventory location and leave the facility without passing through specific entry or exit gates.

FIG. 1G illustrates another example AC scenario within the facility 100 of FIG. 1A. In this example, the user 102 enters the facility. In this example, there are no particular AC entry or exit locations and/or entry or exit gates. For instance, the user 102 may simply walk up to an ordering location 108. Envision, for example, an ordering kiosk for a coffee stand within an airport. At the ordering location 108, the user 102 orders a customizable item 126. Therefore, at $T_1$ the system may identify the user 102 and generate a record indicating that the user 102 is eligible perform AC. In this example, the user 102 may have been identified as part of entering the order via the input device 112(2). Additionally, or alternatively, the user 102 may have been identified, and/or additional identifying data (e.g., biometric recognition data, etc.) may have been provided by sensors 114 at the facility 100, including sensor 114(2) at the ordering location 108 and/or other sensors 114 before and/or after the user 102 placed the order (e.g., sensor 114(1)). Also note that at $T_1$ the system may simply begin tracking user 102 without having necessarily identified user 102. For instance, the system may recognize user 102 as a person that made the order, but may not link user 102 to an account until user 102 provides identifying information upon checkout, for instance.

Continuing with the scenario in FIG. 1G, after $T_1$ the customizable item 126 is added to the virtual cart of the user 102, and at $T_2$ user 102 receives the customizable item 126 and exits the facility 100 at $T_3$. Since the facility does not include particular exit location in this example, at $T_4$ the transaction is processed upon the system determining that the user is exiting and/or has exited the facility, such as via data from sensors 114. In some cases, the transaction may be processed simply based on the order event. For instance, the system may receive the order at ordering location 108, and upon determining that user 102 placed the order at a confidence level that meets a predetermined threshold, the system may proceed to charge a payment instrument of the user without necessarily waiting for the user to receive the item and/or exit the facility. In some examples, the system may not receive and/or begin processing the order until the system is able to confirm a valid payment instrument of the user. For instance, the user may order a custom coffee from the ordering location 108, but the system may not send the order to associate 120 (e.g., a barista) until the system confirms that an account of the user is associated with a valid payment instrument, or until the user 102 enters a valid payment instrument, or actually pays for the coffee, etc.

Figure 2:
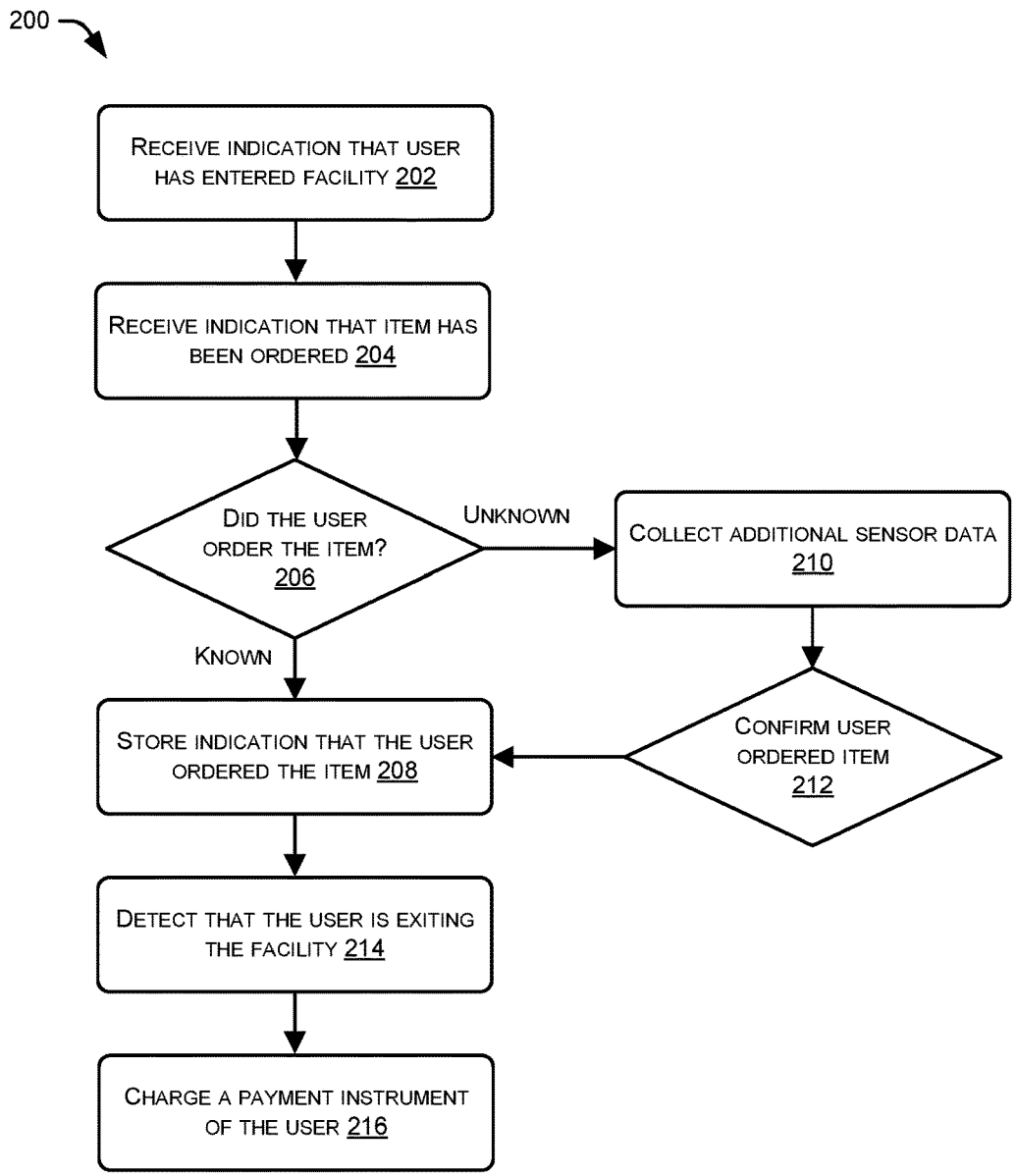
FIG. 2 illustrates an example process for determining whether a user has ordered one or more items at a facility, in accordance with the present AC techniques.

FIG. 2 illustrates an example process 200 for determining whether a user has ordered one or more items at a facility. This process, and other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At 202, a system coupled to one or more sensors in a facility may receive an indication that a user has entered the facility. For example, the system may receive an indication that a user has scanned identifying information, such as a unique code presented on a mobile device of the user, at a scanning device at an entry location of the facility. In another example, the received indication may be based on image data captured by one or more cameras located at the facility, with the image data showing the user entering the facility. In still another example, the indication may be based on weight sensors on a floor of the facility identifying an entering user, voice data of the entering user, or the like. Further, the indication may be received at a time that the user enters an order at a user input device.

At 204, the system may receive an indication that an item has been ordered. For example, the system may receive user input data from a user input device suggesting that a customizable item has been ordered. The user input device may be located within an ordering location or an inventory location of the facility, or at another location. The user input data may include item identification data and/or customizable options associated with the item. The user input device may communicate the user input data to the system along with a timestamp associated with the order.

At 206, the system may determine whether the user ordered the item. The system may use sensor data generated by at least one sensor at the facility to determine whether the user was at the user input device at the same time or approximately the same time as the timestamp associated with the order, for instance. For example, the system may keep a list of users and times that the users were positioned at and/or entered an order into the user input device. In the case of a crowded facility, or a fast-moving order line, the system may adjust a granularity of the timestamp matching, timestamp recording, and/or list keeping, to assist in providing a higher confidence level that any given user is associated with an order. For instance, the system may provide the sensor data and/or additional data into one or more trained classifiers, which may output result data indicating the order as being associated with a user interacting with a user input device, or a user positioned at a user input device at a time of the order, or the like. In addition, the one or more classifiers may output a confidence level indicating a degree of accuracy of the result data. Additionally, or alternatively, the system may receive the indication of the order, then consult the sensor data to attempt to determine which user placed the order. In other words, the system may receive the order, then "go looking" for the user that placed the order by accessing sensor data collected at a time the order was placed.

In an instance where the system determines that the user is "known" to have placed the order, process 200 may proceed to 208, where the system may store an indication that the user ordered the item. For example, the system may store the indication with a record associated with the user and/or in a virtual cart of the user. The system may determine that the user placed the order when a result associated with the event of the user placing the order is determined to have a confidence level greater than a threshold value, for instance. In another instance where the system determines that it is "unknown" whether the user placed the order, at 210 the system may collect more sensor data until a determination of a person that placed the order can be made. At 212, the system may be able to confirm that the user placed the order for the item. For example, the system may be able to increase a confidence level associated with the event of the order beyond a threshold value. Additionally or alternatively, the system may receive confirmation of the order from the user or from an associate of the facility. Thus, process 200 may proceed from 212 to 208, described above.

At 214, the system may detect that the user is exiting the facility. Then at 216 the system may process a transaction with the user using automatic-checkout (AC) techniques. That is, the system may identify a payment instrument or other account previously associated with an account of the user in the system and may use this payment instrument or account information to charge the user for a cost of the acquired items. Thus, the user has been able to purchase (or otherwise acquire) items from the facility by simply walking into the facility, procuring one or more items, and walking out of the facility (potentially along with providing identifying information upon entry and/or exit of the facility).

Figure 3:
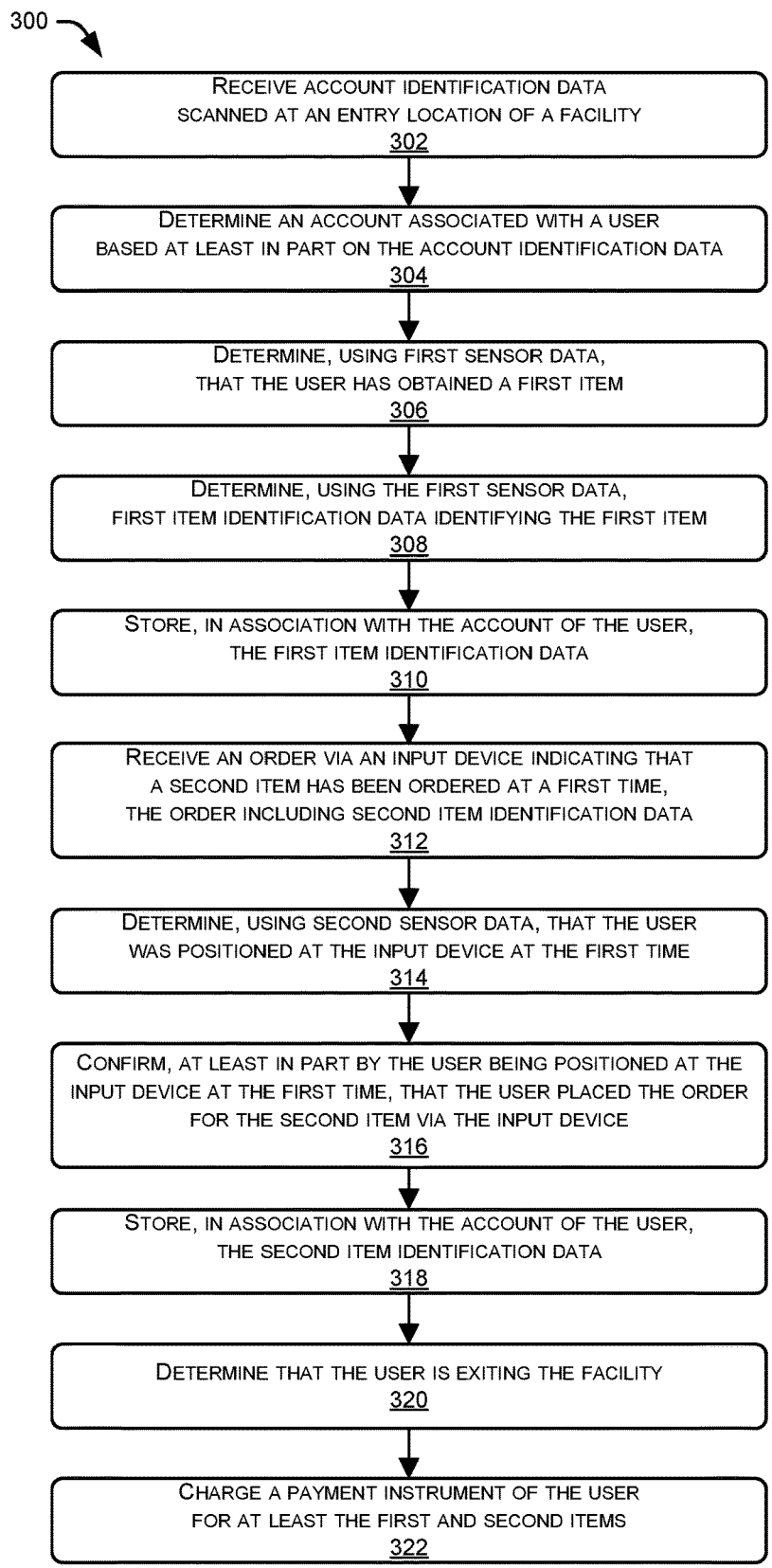
FIG. 3 illustrates an example process for, in part, determining that a user has ordered one or more customizable items within a facility, determining that the user is eligible to exit through an exit location of the facility, and charging a payment instrument of the user based on the one or more items ordered by the user, in accordance with the present AC techniques.

FIG. 3 illustrates an example process 300 for, in part, determining that a user has ordered one or more customizable items within a facility, determining that the user is eligible to exit through an exit location of the facility, and charging a payment instrument of the user based on the one or more items ordered by the user. At 302, the system described above may receive account identification data scanned at an entry location of the facility. For example, the system may receive an indication that a user used a mobile device of the user to scan a code presented on the device at the entry location. At 304, the system may, in response, determine an account associated with the user based at least in part on the account identification data. That is, the system may map the account identification data to a unique account at the system associated with the user that entered the facility.

At 306, the system may determine, using first sensor data, that the user obtained a first item. For example, the sensor data may comprise image data, weight-sensor data, or any other type of data that may indicate that the user picked an item from an inventory location, received an item from another user in the facility, or otherwise obtained an item while in the facility. At 308, the system determines, using the first sensor data, first item identification data identifying the first item obtained by the user. For example, the system may input the sensor data and/or additional data into one or more trained classifiers for determining the first item identification of the first item. At 310, the system stores, in association with the account of the user, the first item identification data. For example, the system may store, in the account, an indication that the user has picked or otherwise received the first item. In some instances, this indication is stored based at least in part on the result of the event being associated with a high confidence. Further, the system may maintain, for the user, the indication that the user is eligible to exit the facility, with items, without first performing a manual checkout of the items.

At 312, the system receives an order via an input device indicating that a second item has been ordered. Further, the order may be associated with a first timestamps, and/or the order may include second item identification data. At 314, the system may determine, using second sensor data, that the user was positioned at the input device at a second timestamp. For example, the second sensor data may comprise image data or any other type of data that may indicate that the user was standing in front of, in arm's reach of, or otherwise proximate to the input device, and/or was at an ordering location of the facility, at a time indicated by the second timestamp. At 316, the system may confirm, at least in part by comparing the first timestamp with the second timestamp, that the user placed the order for the second item via the input device. For instance, the system may determine that a difference in times between the first timestamp and the second timestamp is small enough and/or is otherwise within an acceptable range or margin of error for the system to be confident in confirming that the user placed the order. Also, at 318, the system may store, in association with the account of the user, the second item identification data.

The user is now eligible to exit the facility, with items, through the AC exit location. The system may also update the record associated with the user to indicate that the user is eligible to "just walk out". At 320 the system may determine that the user is exiting or has exited the facility.

In addition, at 322, the system may charge a payment instrument or other account of the user for at least a cost of the first and second items.

Figure 4:
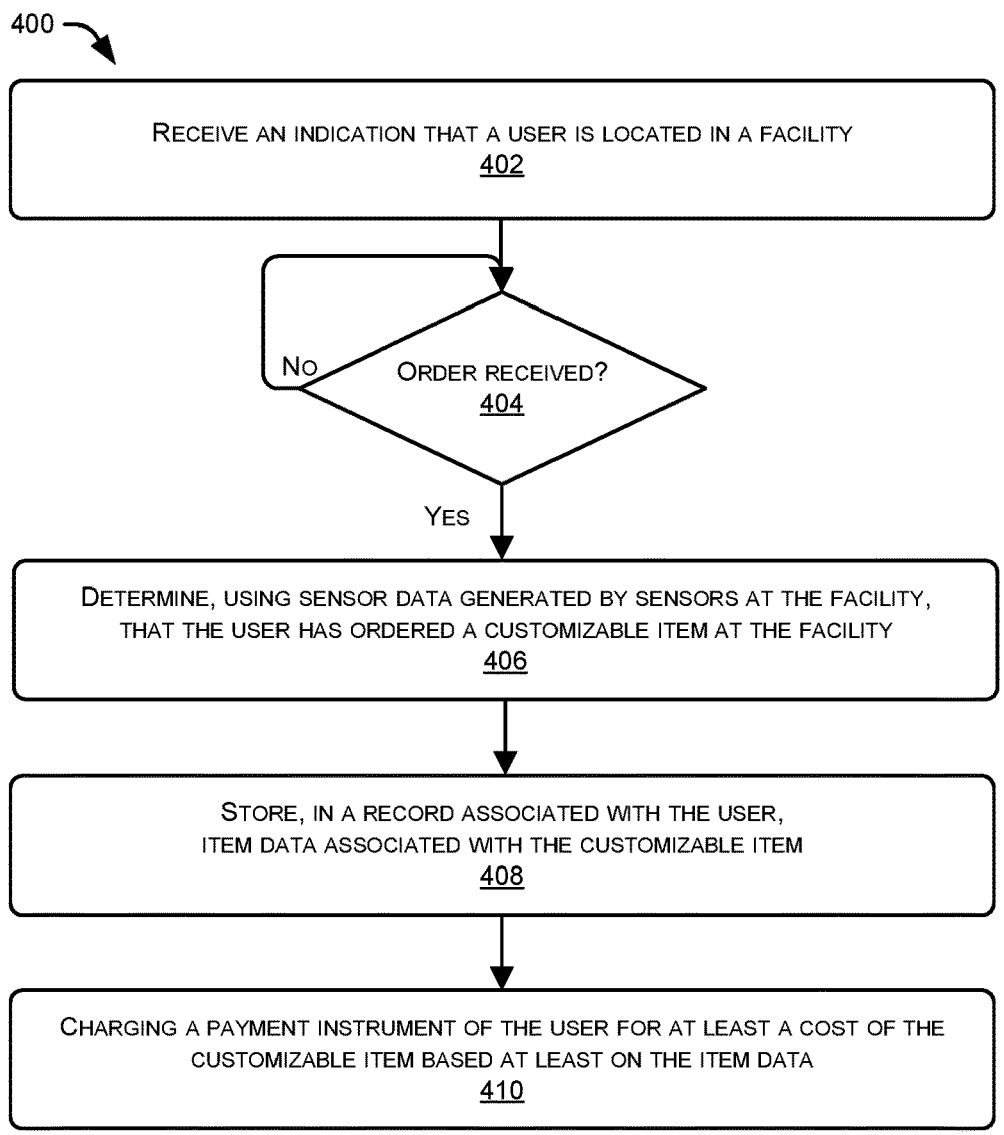
FIG. 4 illustrates an example process for determining whether a user has ordered a customizable item at a facility, in accordance with the present AC techniques.

FIG. 4 illustrates an example process 400 for determining whether a user has ordered one or more customizable items at a facility. At 402, the system again receives an indication that a user is located in a facility, using any one or more of the techniques described above. At 404, the system determines whether an order has been received. For example, the system may receive user input data indicating the order. The user input data may be received via a user input device and/or via a sensor at the facility. The user input data may be entered or otherwise provided by the user, or the user input data may have been entered or otherwise provided by an associate at the facility. For instance, the associate make verbally receive the order from the user, or may enter the order based on consulting with the user. If an order is not received, then the system continues to monitor for such an order.

At 406, the system determines, using sensor data generated by sensors at the facility, that the user has ordered a customizable item at the facility. The system may update a record of the user to reflect the order of the customizable item. Further, at 408, the system may store, in the record associated with the user, item data associated with the customizable item. The item data may include, for instance, an identity of the item(s) involved, a quantity and/or size of the item(s), information regarding customizable options of the item(s), and/or additional data. The record of the user may include any of a variety of types of additional information, such as location data of the user at the facility, whether the user is eligible to remove items from the facility without performing a manual checkout of the items, and an identity of the user 102, for example. At 410, the system may charge a payment instrument of the user for at least a cost of the customizable item based at least on the item data. For example, the system may determine that the user is intending to exit, is exiting, and/or has exited the facility, and charge the user for the cost of one or more items in a virtual cart of the user.

Several additional scenarios are contemplated in which a user may be determined to be ineligible to exit the facility using AC. For example, the system may lose track of a user or the identity of the user while the user is at the facility. In other examples, an event may require additional authorization and/or identification of the user. For example, if the user has picked one or more items having a combined cost that is greater than a threshold, then the system may determine that the user is to provide verification of his or her identity (e.g., by showing an official identification to an associate at the facility) and, thus, is currently ineligible to exit using AC. In another example, if the user picks a number of items that is greater than a threshold, or has picked a particular item (e.g., alcohol, etc.), then then the system may determine that the user is to provide verification of his or her identity and, thus, is currently ineligible to exit using AC. In another example, if the system determines that the user has visited the facility a number of times (e.g., five) within a threshold amount of time (e.g., a single business day), then the system may again determine that the user is ineligible to exit using AC until the user provides additional verification.

In still other scenarios, a user that has entered the facility may be associated with a payment instrument (e.g., credit card, debit card, prepaid card) associated with a predefined limit (e.g., $20, $1,000, etc.). For instance, the user may have scanned or otherwise provided identifying information associated with the payment instrument upon entering the facility, or the system may have determined the payment instrument associated with the user after identifying the user in another way. In these instances, upon a virtual cart reaching a total cost that nears, reaches, or exceeds the limit of the payment instrument, the system may determine that the user is ineligible to exit the facility without performing a manual checkout of his or her items. Of course, while a few examples are provided, it is to be appreciated that other events may occur that cause the system to update the record associated with the user in various ways.

Figure 5:
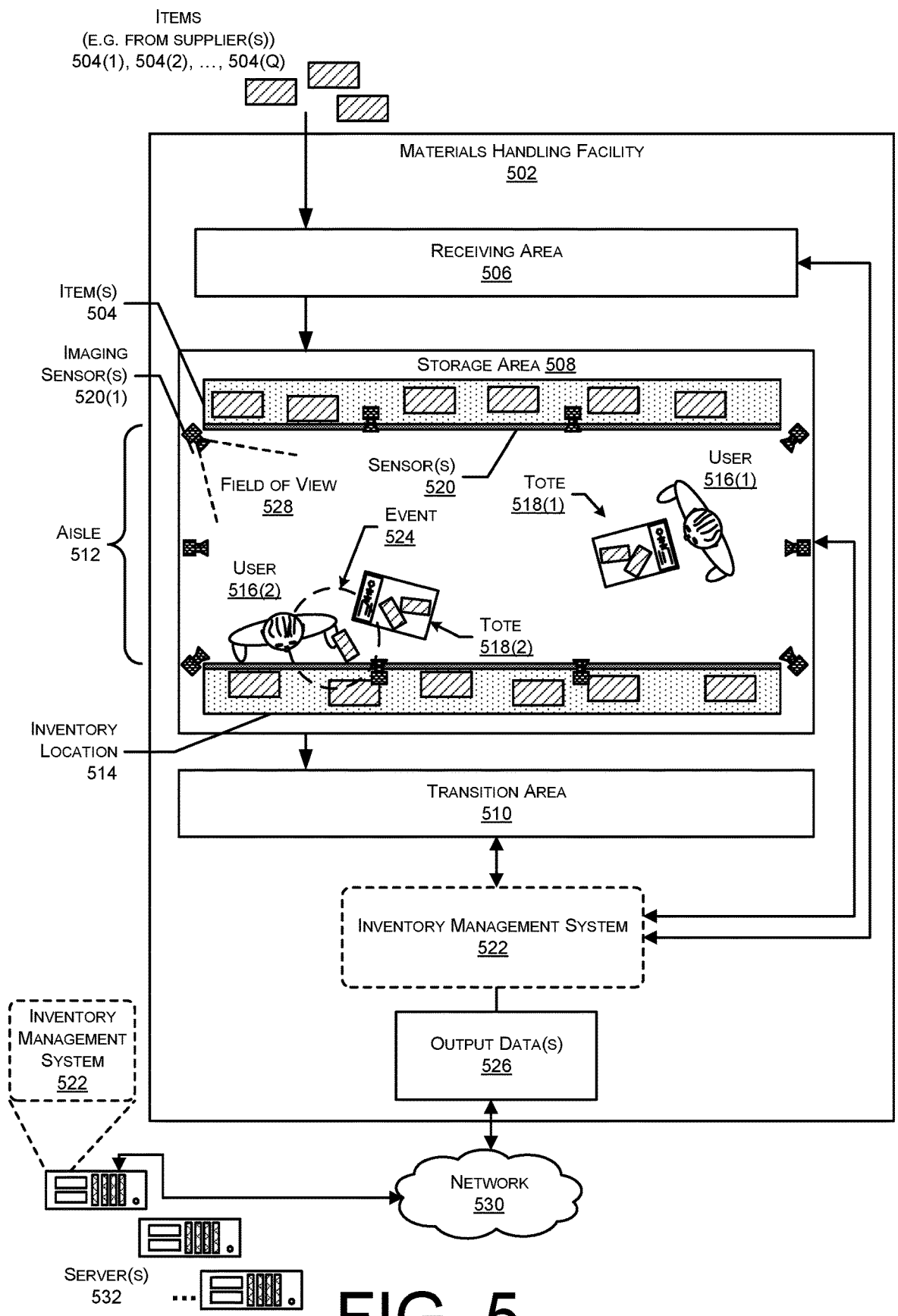
FIG. 5 is a block diagram of an example materials handling facility that includes sensors and an inventory management system configured to generate output regarding events occurring in the facility using the sensor data.
Figure 6:
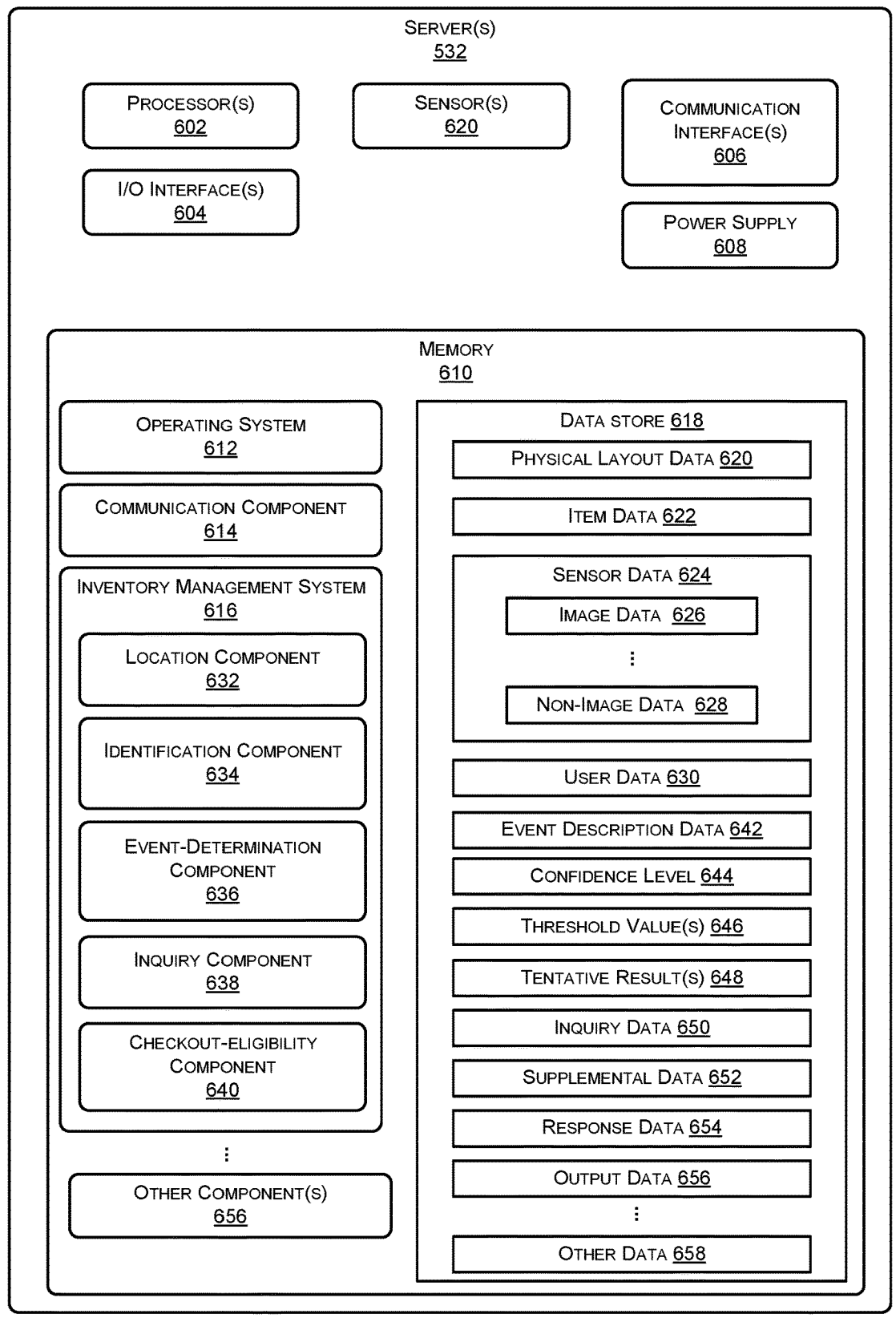
FIG. 6 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 5 and 6 represent an illustrative materials handing environment, such as the materials handling facility 502, in which the techniques described herein may be applied to cameras monitoring the environments as described below. However, the following description is merely one illustrative example of an industry and environment in which the techniques described herein may be utilized. The materials handling facility 502 (or "facility") comprises one or more physical structures or areas within which one or more items 504(1), 504(2), . . . , 504(Q) (generally denoted as 504) may be held. As used in this disclosure, letters in parentheses such as "(Q)" indicate an integer result. The items 504 comprise physical goods, such as books, pharmaceuticals, repair parts, electronic gear, groceries, and so forth.

The facility 502 may include one or more areas designated for different functions with regard to inventory handling. In this illustration, the facility 502 includes a receiving area 506, a storage area 508, and a transition area 510. The receiving area 506 may be configured to accept items 504, such as from suppliers, for intake into the facility 502. For example, the receiving area 506 may include a loading dock at which trucks or other freight conveyances unload the items 504.

The storage area 508 is configured to store the items 504. The storage area 508 may be arranged in various physical configurations. In one implementation, the storage area 508 may include one or more aisles 512. The aisle 512 may be configured with, or defined by, inventory locations 514 on one or both sides of the aisle 512. The inventory locations 514 may include one or more of shelves, racks, cases, cabinets, bins, floor locations, or other suitable storage mechanisms for holding or storing the items 504. The inventory locations 514 may be affixed to the floor or another portion of the facility's structure, or may be movable such that the arrangements of aisles 512 may be reconfigurable. In some implementations, the inventory locations 514 may be configured to move independently of an outside operator. For example, the inventory locations 514 may comprise a rack with a power source and a motor, operable by a computing device to allow the rack to move from one location within the facility 502 to another.

One or more users 516(1), 516(2), . . . , 516(U), totes 518(1), 518(2), . . . , 518(T) (generally denoted as 518) or other material handling apparatus may move within the facility 502. For example, the users 516 may move about within the facility 502 to pick or place the items 504 in various inventory locations 514, placing them on the totes 518 for ease of transport. An individual tote 518 is configured to carry or otherwise transport one or more items 504. For example, a tote 518 may include a basket, a cart, a bag, and so forth. In other implementations, other agencies such as robots, forklifts, cranes, aerial drones, and so forth, may move about the facility 502 picking, placing, or otherwise moving the items 504.

One or more sensors 520 may be configured to acquire information in the facility 502. The sensors 520 in the facility 502 may include sensors fixed in the environment (e.g., ceiling-mounted cameras) or otherwise, such as sensors in the possession of users (e.g., mobile phones, tablets, etc.). The sensors 520 may include, but are not limited to, cameras 520(1), weight sensors, radio frequency (RF) receivers, temperature sensors, humidity sensors, vibration sensors, and so forth. The sensors 520 may be stationary or mobile, relative to the facility 502. For example, the inventory locations 514 may contain cameras 520(1) configured to acquire images of pick or placement of items 504 on shelves, of the users 516(1) and 516(2) in the facility 502, and so forth. In another example, the floor of the facility 502 may include weight sensors configured to determine a weight of the users 516 or another object thereupon.

During operation of the facility 502, the sensors 520 may be configured to provide information suitable for tracking how objects move or other occurrences within the facility 502. For example, a series of images acquired by a camera 520(1) may indicate removal of an item 504 from a particular inventory location 514 by one of the users 516 and placement of the item 504 on or at least partially within one of the totes 518.

While the storage area 508 is depicted as having one or more aisles 512, inventory locations 514 storing the items 504, sensors 520, and so forth, it is understood that the receiving area 506, the transition area 510, or other areas of the facility 502 may be similarly equipped. Furthermore, the arrangement of the various areas within the facility 502 is depicted functionally rather than schematically. For example, multiple different receiving areas 506, storage areas 508, and transition areas 510 may be interspersed rather than segregated in the facility 502.

The facility 502 may include, or be coupled to, an inventory management system 522, which may perform some or all of the techniques described above with reference to FIGS. 1-4. For example, the inventory management system may maintain a virtual cart of each user within the facility. The inventory management system may also store a record associated with each user indicating the identity of the user, the location of the user, and whether the user is eligible to exit the facility with one or more items without performing a manual checkout of the items. The inventory management system may also generate and output notification data to the users, indicating whether or not they are so eligible.

As illustrated, the inventory management system 522 may reside at the facility 502 (e.g., as part of on-premises servers), on the servers 532 that are remote from the facility 502, a combination thereof. In each instance, the inventory management system 522 is configured to identify interactions and events with and between users 516, devices such as sensors 520, robots, material handling equipment, computing devices, and so forth, in one or more of the receiving area 506, the storage area 508, or the transition area 510. As described above, some interactions may further indicate the existence of one or more events 524, or predefined activities of interest. For example, events 524 may include the entry of the user 516 to the facility 502, stocking of items 504 at an inventory location 514, picking of an item 504 from an inventory location 514, returning of an item 504 to an inventory location 514, placement of an item 504 within a tote 518, movement of users 516 relative to one another, gestures by the users 516, and so forth. Other events 524 involving users 516 may include the user 516 providing authentication information in the facility 502, using a computing device at the facility 502 to authenticate identity to the inventory management system 522, and so forth. Some events 524 may involve one or more other objects within the facility 502. For example, the event 524 may comprise movement within the facility 502 of an inventory location 514, such as a counter mounted on wheels. Events 524 may involve one or more of the sensors 520. For example, a change in operation of a sensor 520, such as a sensor failure, change in alignment, and so forth, may be designated as an event 524. Continuing the example, movement of a camera 520(1) resulting in a change in the orientation of the field of view 528 (such as resulting from someone or something bumping the camera 520(1)) may be designated as an event 524.

By determining the occurrence of one or more of the events 524, the inventory management system 522 may generate output data 526. The output data 526 comprises information about the event 524. For example, where the event 524 comprises an item 504 being removed from an inventory location 514, the output data 526 may comprise an item identifier indicative of the particular item 504 that was removed from the inventory location 514 and a user identifier of a user that removed the item.

The inventory management system 522 may use one or more automated systems to generate the output data 526. For example, an artificial neural network, one or more classifiers, or other automated machine learning techniques may be used to process the sensor data from the one or more sensors 520 to generate output data 526. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 526 or the tentative results. The automated systems may generate confidence level data that provides information indicative of the accuracy or confidence that the output data 526 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 504, user 516, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 516 may pick an item 504(1) such as a perfume bottle that is generally cubical in shape from the inventory location 514. Other items 504 at nearby inventory locations 514 may be predominantly spherical. Based on the difference in shape (cube vs. sphere) from the adjacent items, and the correspondence in shape with the previously stored image of the perfume bottle item 504(1) (cubical and cubical), the confidence level that the user 106 has picked up the perfume bottle item 504(1) is high.

In some situations, the automated techniques may be unable to generate output data 526 with a confidence level above a threshold result. For example, the automated techniques may be unable to distinguish which user 516 in a crowd of users 516 has picked up the item 504 from the inventory location 514. In other situations, it may be desirable to provide human confirmation of the event 524 or of the accuracy of the output data 526. For example, some items 504 may be deemed age restricted such that they are to be handled only by users 516 above a minimum age threshold.

In instances where human confirmation is desired, sensor data associated with an event 524 may be processed to generate inquiry data. The inquiry data may include a subset of the sensor data associated with the event 524. The inquiry data may also include one or more of one or more tentative results as determined by the automated techniques, or supplemental data. The subset of the sensor data may be determined using information about the one or more sensors 520. For example, camera data such as the location of the camera 520(1) within the facility 502, the orientation of the camera 520(1), and a field of view 528 of the camera 520(1) may be used to determine if a particular location within the facility 502 is within the field of view 528. The subset of the sensor data may include images that may show the inventory location 514 or that the item 504 was stowed. The subset of the sensor data may also omit images from other cameras 520(1) that did not have that inventory location 514 in the field of view 528. The field of view 528 may comprise a portion of the scene in the facility 502 that the sensor 520 is able to generate sensor data about.

Continuing the example, the subset of the sensor data may comprise a video clip acquired by one or more cameras 520(1) having a field of view 528 that includes the item 504. The tentative results may comprise the "best guess" as to which items 504 may have been involved in the event 524. For example, the tentative results may comprise results determined by the automated system that have a confidence level above a minimum threshold.

The facility 502 may be configured to receive different kinds of items 504 from various suppliers and to store them until a customer orders or retrieves one or more of the items 504. A general flow of items 504 through the facility 502 is indicated by the arrows of FIG. 5. Specifically, as illustrated in this example, items 504 may be received from one or more suppliers, such as manufacturers, distributors, wholesalers, and so forth, at the receiving area 506. In various implementations, the items 504 may include merchandise, commodities, perishables, or any suitable type of item 504, depending on the nature of the enterprise that operates the facility 502. The receiving of the items 504 may comprise one or more events 524 for which the inventory management system 522 may generate output data 526.

Upon being received from a supplier at receiving area 506, the items 504 may be prepared for storage. For example, items 504 may be unpacked or otherwise rearranged. The inventory management system 522 may include one or more software applications executing on a computer system to provide inventory management functions based on the events 524 associated with the unpacking or rearrangement. These inventory management functions may include maintaining information indicative of the type, quantity, condition, cost, location, weight, or any other suitable parameters with respect to the items 504. The items 504 may be stocked, managed, or dispensed in terms of countable, individual units or multiples, such as packages, cartons, crates, pallets, or other suitable aggregations. Alternatively, some items 504, such as bulk products, commodities, and so forth, may be stored in continuous or arbitrarily divisible amounts that may not be inherently organized into countable units. Such items 504 may be managed in terms of measurable quantity such as units of length, area, volume, weight, time, duration, or other dimensional properties characterized by units of measurement. Generally speaking, a quantity of an item 504 may refer to either a countable number of individual or aggregate units of an item 504 or a measurable amount of an item 504, as appropriate.

After arriving through the receiving area 506, items 504 may be stored within the storage area 508. In some implementations, like items 504 may be stored or displayed together in the inventory locations 514 such as in bins, on shelves, hanging from pegboards, and so forth. In this implementation, all items 504 of a given kind are stored in one inventory location 514. In other implementations, like items 504 may be stored in different inventory locations 514. For example, to optimize retrieval of certain items 504 having frequent turnover within a large physical facility 502, those items 504 may be stored in several different inventory locations 514 to reduce congestion that might occur at a single inventory location 514. Storage of the items 504 and their respective inventory locations 514 may comprise one or more events 524.

When a customer order specifying one or more items 504 is received, or as a user 516 progresses through the facility 502, the corresponding items 504 may be selected or "picked" from the inventory locations 514 containing those items 504. In various implementations, item picking may range from manual to completely automated picking. For example, in one implementation, a user 516 may have a list of items 504 they desire and may progress through the facility 502 picking items 504 from inventory locations 514 within the storage area 508, and placing those items 504 into a tote 518. In other implementations, employees of the facility 502 may pick items 504 using written or electronic pick lists derived from customer orders. These picked items 504 may be placed into the tote 518 as the employee progresses through the facility 502. Picking may comprise one or more events 524, such as the user 516 in moving to the inventory location 514, retrieval of the item 504 from the inventory location 514, and so forth.

After items 504 have been picked, they may be processed at a transition area 510. The transition area 510 may be any designated area within the facility 502 where items 504 are transitioned from one location to another or from one entity to another. For example, the transition area 510 may be a packing station within the facility 502. When the item 504 arrives at the transition area 510, the items 504 may be transitioned from the storage area 508 to the packing station. The transitioning may comprise one or more events 524. Information about the transition may be maintained by the inventory management system 522 using the output data 526 associated with those events 524.

In another example, if the items 504 are departing the facility 502 a list of the items 504 may be obtained and used by the inventory management system 522 to transition responsibility for, or custody of, the items 504 from the facility 502 to another entity. For example, a carrier may accept the items 504 for transport with that carrier accepting responsibility for the items 504 indicated in the list. In another example, a customer may purchase or rent the items 504 and remove the items 504 from the facility 502. The purchase or rental may comprise one or more events 524.

The inventory management system 522 may access or generate sensor data about the facility 502 and the contents therein including the items 504, the users 516, the totes 518, and so forth. The sensor data may be acquired by one or more of the sensors 520, data provided by other systems, and so forth. For example, the sensors 520 may include cameras 520(1) configured to acquire image data of scenes in the facility 502. The image data may comprise still images, video, or a combination thereof. The image data may be processed by the inventory management system 522 to determine a location of the user 516, the tote 518, the identity of the user 516, and so forth. As used herein, the identity of the user may represent a unique identifier of the user (e.g., name, number associated with user, username, etc.), an identifier that distinguishes the user amongst other users being located with the environment, or the like.

The inventory management system 522, or systems coupled thereto, may be configured to identify the user 516, as well as to determine other candidate users. In one implementation, this determination may comprise comparing sensor data with previously stored identity data. For example, the user 516 may be identified by showing their face to a facial recognition system, by presenting a token carrying authentication credentials, providing a fingerprint, scanning a barcode or other type of unique identifier upon entering the facility, and so forth. Identity of the user 516 may be determined before, during, or after entry to the facility 502. Determination of the user's 516 identity may comprise comparing sensor data associated with the user 516 in the facility 502 to previously stored user data.

In some instances, the inventory management system group users within the facility into respective sessions. That is, the inventory management system 522 may utilize the sensor data to determine groups of users that are effectively "together" (e.g., shopping together). In some instances, a particular session may include multiple users that entered the facility 502 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 518. Noting the child and the mother as belonging to the same session may increase the chances of successfully adding the box of cereal to the virtual shopping cart of the mother.

By determining the occurrence of one or more events 524 and the output data 526 associated therewith, the inventory management system 522 is able to provide one or more services to the users 516 of the facility 502. By utilizing one or more human associates to process inquiry data and generate response data that may then be used to produce output data 526, overall accuracy of the system may be enhanced. The enhanced accuracy may improve the user experience of the one or more users 516 of the facility 502. In some examples, the output data 526 may be transmitted over a network 530 to one or more servers 532.

FIG. 6 illustrates a block diagram of the one or more servers 532. The servers 532 may be physically present at the facility 502, may be accessible by the network 530, or a combination of both. The servers 532 do not require end-user knowledge of the physical location and configuration of the system that delivers the services. Common expressions associated with the servers 532 may include "on-demand computing," "software as a service (SaaS)," "cloud services," "data centers," and so forth. Services provided by the servers 532 may be distributed across one or more physical or virtual devices.

The servers 532 may include one or more hardware processors 602 (processors) configured to execute one or more stored instructions. The processors 602 may comprise one or more cores. The servers 532 may include one or more input/output (I/O) interface(s) 604 to allow the processor 602 or other portions of the servers 532 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, and so forth.

The servers 532 may also include one or more communication interfaces 606. The communication interfaces 606 are configured to provide communications between the servers 532 and other devices, such as the sensors 520, the interface devices, routers, and so forth. The communication interfaces 606 may include devices configured to couple to personal area networks (PANs), wired and wireless local area networks (LANs), wired and wireless wide area networks (WANs), and so forth. For example, the communication interfaces 606 may include devices compatible with Ethernet, Wi-Fi™, and so forth. The servers 532 may also include one or more busses or other internal communications hardware or software that allow for the transfer of data between the various modules and components of the servers 532.

The servers 532 may also include a power supply 608. The power supply 608 is configured to provide electrical power suitable for operating the components in the servers 532.

The servers 532 may further include one or more memories 610. The memory 610 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 610 provides storage of computer-readable instructions, data structures, program modules, and other data for the operation of the servers 532. A few example functional modules are shown stored in the memory 610, although the same functionality may alternatively be implemented in hardware, firmware, or as a system on a chip (SOC).

The memory 610 may include at least one operating system (OS) component 612. The OS component 612 is configured to manage hardware resource devices such as the I/O interfaces 604, the communication interfaces 606, and provide various services to applications or components executing on the processors 602. The OS component 612 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington USA; and so forth.

One or more of the following components may also be stored in the memory 610. These components may be executed as foreground applications, background tasks, daemons, and so forth. A communication component 614 may be configured to establish communications with one or more of the sensors 520, one or more of the devices used by associates, other servers 532, or other devices. The communications may be authenticated, encrypted, and so forth.

The memory 610 may store an inventory management system 616. The inventory management system 616 is configured to provide the inventory functions as described herein with regard to the inventory management system 522. For example, the inventory management system 616 may track movement of items 504 in the facility 502, generate user interface data, and so forth.

The inventory management system 616 may access information stored in one or more data stores 618 in the memory 610. The data store 618 may use a flat file, database, linked list, tree, executable code, script, or other data structure to store the information. In some implementations, the data store 618 or a portion of the data store 618 may be distributed across one or more other devices including other servers 532, network attached storage devices, and so forth.

The data store 618 may include physical layout data 620. The physical layout data 620 provides a mapping of physical locations within the physical layout of devices and objects such as the sensors 520, inventory locations 514, and so forth. The physical layout data 620 may indicate the coordinates within the facility 502 of an inventory location 514, sensors 520 within view of that inventory location 514, and so forth. For example, the physical layout data 620 may include camera data comprising one or more of a location within the facility 502 of a camera 520(1), orientation of the camera 520(1), the operational status, and so forth. Continuing example, the physical layout data 620 may indicate the coordinates of the camera 520(1), pan and tilt information indicative of a direction that the field of view 528 is oriented along, whether the camera 520(1) is operating or malfunctioning, and so forth.

In some implementations, the inventory management system 616 may access the physical layout data 620 to determine if a location associated with the event 524 is within the field of view 528 of one or more sensors 520. Continuing the example above, given the location within the facility 502 of the event 524 and the camera data, the inventory management system 616 may determine the cameras 520(1) that may have generated images of the event 524.

The item data 622 comprises information associated with the items 504. The information may include information indicative of one or more inventory locations 514 at which one or more of the items 504 are stored. The item data 622 may also include order data, SKU or other product identifier, price, quantity on hand, weight, expiration date, images of the item 504, detail description information, ratings, ranking, and so forth. The inventory management system 616 may store information associated with inventory management functions in the item data 622.

The data store 618 may also include sensor data 624. The sensor data 624 comprises information acquired from, or based on, the one or more sensors 520. For example, the sensor data 624 may comprise 3D information about an object in the facility 502. As described above, the sensors 520 may include a camera 520(1), which is configured to acquire one or more images. These images may be stored as the image data 626. The image data 626 may comprise information descriptive of a plurality of picture elements or pixels. Non-image data 628 may comprise information from other sensors 520, such as input from microphones, weight sensors, and so forth.

User data 630 may also be stored in the data store 618. The user data 630 may include identity data, information indicative of a profile, purchase history, location data, images of the user 516, demographic data, and so forth. Individual users 516 or groups of users 516 may selectively provide user data 630 for use by the inventory management system 522. The individual users 516 or groups of users 516 may also authorize collection of the user data 630 during use of the facility 502 or access to user data 630 obtained from other systems. For example, the user 516 may opt-in to collection of the user data 630 to receive enhanced services while using the facility 502.

In some implementations, the user data 630 may include information designating a user 516 for special handling. For example, the user data 630 may indicate that a particular user 516 has been associated with an increased number of errors with respect to output data 526. The inventory management system 616 may be configured to use this information to apply additional scrutiny to the events 524 associated with this user 516. For example, events 524 that include an item 504 having a cost or result above the threshold amount may be provided to the associates for processing regardless of the determined level of confidence in the output data 526 as generated by the automated system.

The inventory management system 616 may include one or more of a location component 632, identification component 634, event-determination component 636, inquiry component 638, and checkout-eligibility component 640, potentially amongst other components 656.

The location component 632 functions to locate items or users within the environment of the facility to allow the inventory management system 616 to assign certain events to the correct users. That is, the location component 632 may assign unique identifiers to users as they enter the facility and, with the users' consent, may locate the users throughout the facility 502 over the time they remain in the facility 502. The location component 632 may perform this locating using sensor data 624, such as the image data 626. For example, the location component 632 may receive the image data 626 and may use facial-recognition techniques to identify users from the images. After identifying a particular user within the facility, the location component 632 may then locate the user within the images as the user moves throughout the facility 502. Further, should the location component 632 temporarily "lose" a particular user, the location component 632 may again attempt to identify the users within the facility based on facial recognition, and/or using other techniques such as voice recognition, or the like.

Therefore, upon receiving the indication of the time and location of the event in question, the location component 632 may query the data store 618 to determine which one or more users were at or within a threshold distance of the location of the event at the particular time of the event. Further, the location component 632 may assign different confidence levels to different users, with the confidence levels indicating how likely it is that each corresponding user is the user that is in fact associated with the event of interest.

The location component 632 may access the sensor data 624 in order to determine this location data of the user and/or items. The location data provides information indicative of a location of an object, such as the item 504, the user 516, the tote 518, and so forth. The location may be absolute with respect to the facility 502 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 502, 5.2 m from an inventory location 514 along a heading of 169°, and so forth. For example, the location data may indicate that the user 516(1) is 25.2 m along the aisle 512(1) and standing in front of the inventory location 514. In comparison, a relative location may indicate that the user 516(1) is 32 cm from the tote 518 at a heading of 73° with respect to the tote 118. The location data may include orientation information, such as which direction the user 516 is facing. The orientation may be determined by the relative direction the user's 516 body is facing. In some implementations, the orientation may be relative to the interface device. Continuing the example, the location data may indicate that the user 516(1) is oriented with a heading of 0°, or looking north. In another example, the location data may indicate that the user 516 is facing towards the interface device.

The identification component 634 is configured to identify an object. In one implementation, the identification component 634 may be configured to identify an item 504. In another implementation, the identification component 634 may be configured to identify the user 516. For example, the identification component 634 may use facial recognition techniques to process the image data 626 and determine the identity data of the user 516 depicted in the images by comparing the characteristics in the image data 626 with previously stored results. The identification component 634 may also access data from other sensors 520, such as from an RFID reader, an RF receiver, fingerprint sensors, and so forth.

The event-determination component 636 is configured to process the sensor data 624 and generate output data 656, and may include components described above. The event-determination component 636 may access information stored in the data store 618 including, but not limited to, event description data 642, confidence levels 644, or threshold values 646. In some instances, the event-determination component 636 may be configured to perform some or all of the techniques described above with regards to the event-determination component 636. For instance, the event-determination component 636 may be configured to create and utilize event classifiers for identifying events (e.g., predefined activity) within image data, potentially without use of other sensor data acquired by other sensors in the environment.

The event description data 642 comprises information indicative of one or more events 524. For example, the event description data 642 may comprise predefined profiles that designate movement of an item 504 from an inventory location 514 with the event 524 of "pick". The event description data 642 may be manually generated or automatically generated. The event description data 642 may include data indicative of triggers associated with events occurring in the facility 502. An event may be determined as occurring upon detection of the trigger. For example, sensor data 624 such as a change in weight from a weight sensor 520 at an inventory location 514 may trigger detection of an event of an item 504 being added or removed from the inventory location 514. In another example, the trigger may comprise an image of the user 516 reaching a hand toward the inventory location 514. In yet another example, the trigger may comprise two or more users 516 approaching to within a threshold distance of one another.

The event-determination component 636 may process the sensor data 624 using one or more techniques including, but not limited to, artificial neural networks, classifiers, decision trees, support vector machines, Bayesian networks, and so forth. For example, the event-determination component 636 may use a decision tree to determine occurrence of the "pick" event 524 based on sensor data 624. The event-determination component 636 may further use the sensor data 624 to determine one or more tentative results 648. The one or more tentative results 648 comprise data associated with the event 524. For example, where the event 524 comprises a disambiguation of users 516, the tentative results 648 may comprise a list of possible user 516 identities. In another example, where the event 524 comprises a disambiguation between items 104, the tentative results 648 may comprise a list of possible item identifiers. In some implementations, the tentative result 648 may indicate the possible action. For example, the action may comprise the user 516 picking, placing, moving an item 504, damaging an item 504, providing gestural input, and so forth.

In some implementations, the tentative results 648 may be generated by other components. For example, the tentative results 648 such as one or more possible identities or locations of the user 516 involved in the event 524 may be generated by the location component 632. In another example, the tentative results 648 such as possible items 504 that may have been involved in the event 524 may be generated by the identification component 634.

The event-determination component 636 may be configured to provide a confidence level 644 associated with the determination of the tentative results 648. The confidence level 644 provides indicia as to the expected level of accuracy of the tentative result 648. For example, a low confidence level 644 may indicate that the tentative result 648 has a low probability of corresponding to the actual circumstances of the event 524. In comparison, a high confidence level 644 may indicate that the tentative result 648 has a high probability of corresponding to the actual circumstances of the event 524.

In some implementations, the tentative results 648 having confidence levels 644 that exceed the threshold may be deemed to be sufficiently accurate and thus may be used as the output data 656. For example, the event-determination component 636 may provide tentative results 648 indicative of the three possible items 504(1), 504(2), and 504(3) corresponding to the "pick" event 524. The confidence levels 644 associated with the possible items 504(1), 504(2), and 504(3) may be 25%, 70%, 92%, respectively. Continuing the example, the threshold value 646 may be set such that confidence level 644 of 90% are deemed to be sufficiently accurate. As a result, the event-determination component 636 may designate the "pick" event 524 as involving item 504(3).

The inquiry component 638 may be configured to use at least a portion of the sensor data 624 associated with the event 524 to generate inquiry data 650. In some implementations, the inquiry data 650 may include one or more of the tentative results 648 or supplemental data 652. The inquiry component 638 may be configured to provide inquiry data 650 to one or more devices associated with one or more human associates.

An associate user interface is presented on the respective devices of associates. The associate may generate response data 654 by selecting a particular tentative result 648, entering new information, indicating that they are unable to answer the inquiry, and so forth.

The supplemental data 652 comprises information associated with the event 524 or that may be useful in interpreting the sensor data 624. For example, the supplemental data 652 may comprise previously stored images of the items 504. In another example, the supplemental data 652 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 626 during presentation to an associate.

The inquiry component 638 processes the response data 654 provided by the one or more associates. The processing may include calculating one or more statistical results associated with the response data 654. For example, statistical results may include a count of the number of times associates selected a particular tentative result 648, determination of a percentage of the associates that selected a particular tentative result 648, and so forth.

The inquiry component 638 is configured to generate the output data 656 based at least in part on the response data 654. For example, given that a majority of the associates returned response data 654 indicating that the item 504 associated with the "pick" event 524 is item 504(5), the output data 526 may indicate that the item 504(5) was picked.

The inquiry component 638 may be configured to selectively distribute inquiries to particular associates. For example, some associates may be better suited to answering particular types of inquiries. Performance data, such as statistical data about the performance of the associates, may be determined by the inquiry component 638 from the response data 654 provided by the associates. For example, information indicative of a percentage of different inquiries in which the particular associate selected response data 654 that disagreed with the majority of associates may be maintained. In some implementations, test or practice inquiry data 650 having a previously known correct answer may be provided to the associate for training or quality assurance purposes. The determination of the set of associates to use may be based at least in part on the performance data.

By using the inquiry component 638, the event-determination component 636 may be able to provide high reliability output data 656 that accurately represents the event 524. The output data 656 generated by the inquiry component 638 from the response data 654 may also be used to further train the automated systems used by the inventory management system 616. For example, the sensor data 624 and the output data 656, based on response data 654, may be provided to one or more of the components of the inventory management system 616 for training in process improvement. Continuing the example, this information may be provided to an artificial neural network, Bayesian network, and so forth, to further train these systems such that the confidence level 644 and the tentative results 648 produced in the future for the same or similar input is improved. Finally, as FIG. 6 illustrates, the servers 532 may store and/or utilize other data 658.

The checkout-eligibility component 640, meanwhile, may perform some or all of the operations described above with reference to processes 200, 300, and 400. For instance, the checkout-eligibility component 640 may store indications, for each of respective users within a facility, whether the respective user is currently eligible to exit through an AC exit location or otherwise eligible to exit a facility with one or more items without performing manual checkout of the items. The checkout-eligibility component 640 may change these respective indications based on predefined events that occur within the facility, as described above. For instance, a user that is identified upon entry to the facility may be initially eligible, but thereafter may be deemed ineligible upon performing an event at an inventory location. Conversely, a user that is not identified upon entry and, thus, initially ineligible may become eligible upon being identified by the identification component 634. The checkout-eligibility component 640 may also generate and output the notification data, discussed above.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors; and
one or more computer-readable media storing computer-executable instructions that, when executed, cause the one or more processors to perform acts comprising:
receiving, from at least one of a first user input device or a first sensor, entry event information indicating that a user entered an automated checkout (AC) entry location located within an AC facility comprising an AC system, wherein the at least one of the first user input device or the first sensor are positioned proximate the AC entry location;
receiving an order for a customizable item, via a second user input device positioned proximate an ordering location within the AC facility, wherein the customizable item comprises one or more customizable product configurations associated with respective costs;
receiving image data associated with an event that is generated by a camera, the image data being associated with one or more timestamps and representing at least an area at which the second user input device is positioned proximate the ordering location within the AC facility, wherein the camera is independent from the second user input device and is positioned proximate the ordering location;
determining, using the image data and via one or more classifiers trained to identify user activity, a result associated with the event, wherein the result includes the order for at least one customizable option for the customizable item and an identity of the user, wherein determining the result is based at least in part on a determination that the user was positioned at the second user input device;
determining, using the image data and the one or more classifiers, a confidence associated with the result, wherein the confidence represents a probability of the accuracy of the result;
determining that the confidence is greater than a threshold value;
determining, in response to the determination that the confidence is greater than the threshold value, that the order is associated with the user;
based at least in part on the determining that the order is associated with the user, storing, in a virtual cart associated with the user, order data associated with the customizable item, including a configuration of the customizable item and a cost of the customizable item;
receiving, from at least one of a third user input device or a second sensor, exit event information indicating that the user is exiting the AC facility, wherein the at least one of the third user input device or the second sensor are positioned proximate an exit of the AC facility; and
based at least in part on the receiving of the exit event information indicating that the user is exiting the AC facility, charging, by the AC system, a payment instrument of the user for at least the cost of the customizable item.

2. The system as recited in claim 1, wherein the receiving the indication that the user entered the AC entry location and is located within the AC facility comprises receiving an indication that account identification data associated with an account of the user has been provided at the AC facility.

3. The system as recited in claim 1, wherein:
the determining that the order is associated with the user is further based at least in part on determining, using the image data, that the user received the customizable item.

4. The system as recited in claim 1, wherein:
the determining that the order is associated with the user is further based at least in part on receiving a confirmation of the order from the user.

5. The system as recited in claim 1, wherein:
the one or more computer-readable media further store computer-executable instructions that, when executed, cause the one or more processors to perform an act comprising determining, using the image data, location data indicating a current location of the user in the AC facility.

6. The system as recited in claim 1, wherein:
the determining that the order is associated with the user is further based at least in part on determining, using the image data and via the one or more classifiers trained using previous image data, that the user received the customizable item.

7. The system as recited in claim 6, wherein the determining that the order is associated with the user is further based at least in part on comparing the one or more timestamps with a time the customizable item was received.

8. The system as recited in claim 1, wherein:
the one or more computer-readable media further store computer-executable instructions that, when executed, cause the one or more processors to perform an act comprising determining, using the image data, that the user has received the customizable item; and
the storing, in the virtual cart associated with the user, the order data comprises storing the order data in the virtual cart associated with the user at least partly in response to the determining that the user received the customizable item.

9. The system of claim 1, wherein the second user input device includes at least one of:
a weigh station; or
an order kiosk.

10. One or more non-transitory computer-readable media storing computer-executable instructions that, when executed, cause one or more processors to perform acts comprising:
receiving, from at least one of a first user input device or a first sensor, entry event information indicating that a user entered an automated checkout (AC) entry location located within an AC facility comprising an AC system, wherein the at least one of the first user input device or the first sensor are positioned proximate the AC entry location;
receiving an order for a customizable item, via a second user input device disposed proximate an ordering location within the AC facility, wherein the customizable item comprises one or more customizable product configurations associated with respective costs;
receiving image data associated with an event that is generated by a camera, the image data being associated with one or more timestamps and representing at least an area at which the second user input device is disposed at the ordering location within the AC facility, wherein the camera is independent from the second user input device and is positioned proximate the ordering location;

determining, using the image data and via one or more classifiers trained to identify user activity, a result associated with the event, wherein the result includes the order for at least one customizable option for the customizable item and an identity of the user, wherein determining the result is based at least in part on a determination that the user was positioned at the second input device;

determining, using the image data and the one or more classifiers, a confidence associated with the result, wherein the confidence represents a probability of an accuracy of the result;

determining that the confidence is greater than a threshold value;

determining, in response to the determination that the confidence is greater than the threshold value, that the order is associated with the user;

based at least in part on the determining that the order is associated with the user, storing, in a virtual cart associated with the user, order data associated with the customizable item, including a configuration of the customizable item and a cost of the customizable item;

receiving, from at least one of a third user input device or a second sensor, exit event information indicating that the user is exiting the AC facility, wherein the at least one of the third user input device or the second sensor are positioned proximate an exit of the AC facility; and based at least in part on the receiving of the exit event information indicating that the user is exiting the AC facility, charging, by the AC system, a payment instrument of the user for at least the cost of the customizable item.

11. The non-transitory one or more computer-readable media as recited in claim 10, wherein:
the cost of the customizable item reflects the at least one customizable option.

12. The non-transitory one or more computer-readable media as recited in claim 10, wherein the receiving the indication that the user is located within the AC facility comprises receiving an indication that account identification data associated with an account of the user has been provided at the facility.

13. The non-transitory one or more computer-readable media as recited in claim 10, wherein:
the determining that the order is associated with the user is further based at least in part on determining, using the image data and via the one or more classifiers trained using previous image data, that the user received the customizable item.

14. The non-transitory one or more computer-readable media as recited in claim 13, wherein:
the determining that the order is associated with the user is further based at least in part on comparing the one or more timestamps with a time the customizable item was received.

15. The non-transitory one or more computer-readable media as recited in claim 14, wherein the comparing the one or more timestamps with the time the customizable item was received comprises determining that a time indicated by at least one timestamp of the one or more timestamps is within a predetermined time range of the time the customizable item was received.

16. A method comprising:
receiving, from at least one of a first user input device or a first sensor, entry event information indicating that a user entered an automated checkout (AC) entry location located within an AC facility comprising an AC system, wherein the at least one of the first user input device or the first sensor are positioned proximate the AC entry location;

receiving an order for a customizable item, via a second user input device disposed at an ordering location within the AC facility, wherein the customizable item comprises one or more customizable product configurations associated with respective costs;

receiving image data associated with an event that is generated by a camera, the image data being associated with one or more timestamps and representing at least an area at which the second user input device is disposed at the ordering location within the AC facility, wherein the camera is independent from the second user input device and is positioned proximate the ordering location;

determining, using the image data and via one or more classifiers trained to identify user activity, a result associated with the event, wherein the result includes the order for at least one customizable option for the customizable item and an identity of the user, wherein determining the result is based at least in part on a determination that the user was positioned at the second user input device;

determining, using the image data and the one or more classifiers, a confidence associated with the result, wherein the confidence represents a probability of an accuracy of the result;

determining that the confidence is greater than a threshold value;

determining, in response to the determination that the confidence is greater than the threshold value, that the order is associated with the user;

based at least in part on the determining that the order is associated with the user, storing, in a virtual cart associated with the user, order data associated with the customizable item, including a configuration of the customizable item and a cost of the customizable item;

receiving, from at least one of a third user input device or a second sensor, exit event information indicating that the user is exiting the AC facility, wherein the at least one of the third user input device or the second sensor are positioned proximate an exit of the AC facility; and based at least in part on the receiving of the exit event information indicating that the user is exiting the AC facility, charging, by the AC system, a payment instrument of the user for at least the cost of the customizable item.

17. The method as recited in claim 16, wherein the receiving the indication that the user is located within the AC facility comprises receiving an indication that account identification data associated with an account of the user has been provided at the AC facility.

18. The method as recited in claim 16, wherein
the cost of the customizable item reflects the at least one customizable option.

19. The method as recited in claim 16, wherein:
the determining that the order is associated with the user is further based at least in part on determining that the user received the customizable item.

20. The method as recited in claim 16, wherein:
the determining that the order is associated with the user is further based at least in part on determining, using the image data and via the one or more classifiers trained using previous image data, that the user received the customizable item.

* * * * *